(12) United States Patent
Fujita

(10) Patent No.: US 7,408,535 B2
(45) Date of Patent: Aug. 5, 2008

(54) DRIVING CIRCUIT, METHOD FOR PROTECTING THE SAME, ELECTRO-OPTICAL APPARATUS, AND ELECTRONIC APPARATUS

(75) Inventor: Shin Fujita, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 434 days.

(21) Appl. No.: 10/894,020

(22) Filed: Jul. 20, 2004

(65) Prior Publication Data

US 2005/0052384 A1 Mar. 10, 2005

(30) Foreign Application Priority Data

Jul. 29, 2003 (JP) ............... 2003-281909

(51) Int. Cl.
G09G 3/36 (2006.01)
(52) U.S. Cl. .................................... 345/100
(58) Field of Classification Search ................ 345/211, 345/212, 87, 93, 98, 100, 92
See application file for complete search history.

(56) References Cited

U.S. PATENT DOCUMENTS

| | | | | |
|---|---|---|---|---|
| 4,707,692 A | * | 11/1987 | Higgins et al. | 345/204 |
| 5,424,752 A | * | 6/1995 | Yamazaki et al. | 345/92 |
| 5,619,222 A | * | 4/1997 | So | 345/87 |
| 5,650,834 A | | 7/1997 | Nakagawa et al. | |
| 5,671,026 A | * | 9/1997 | Shiraki et al. | 349/40 |
| 5,760,759 A | * | 6/1998 | Tanaka et al. | 345/95 |
| 5,793,588 A | * | 8/1998 | Jeong | 361/56 |
| 5,909,035 A | | 6/1999 | Kim | |
| 5,930,607 A | * | 7/1999 | Satou | 438/158 |
| 6,157,361 A | | 12/2000 | Kubota et al. | |
| 6,373,460 B1 | | 4/2002 | Kubota et al. | |
| 6,392,622 B1 | | 5/2002 | Ozawa | |
| 6,515,644 B1 | * | 2/2003 | Kim | 345/87 |
| 6,671,146 B1 | | 12/2003 | Hashimoto et al. | |
| 6,753,836 B2 | * | 6/2004 | Kwon | 345/87 |
| 6,906,706 B2 | * | 6/2005 | Kosaka et al. | 345/211 |
| 7,042,428 B2 | * | 5/2006 | Park | 345/87 |
| 2001/0015712 A1 | * | 8/2001 | Hashimoto | 345/92 |
| 2002/0044109 A1 | * | 4/2002 | Kimura | 345/76 |
| 2003/0184507 A1 | * | 10/2003 | Nakazaki | 345/87 |

FOREIGN PATENT DOCUMENTS

| JP | U 64-3827 | 1/1989 |
|---|---|---|
| JP | B2 3-54475 | 8/1991 |

(Continued)

*Primary Examiner*—Amr Awad
*Assistant Examiner*—Randal L Willis
(74) *Attorney, Agent, or Firm*—Oliff & Berridge, PLC

(57) ABSTRACT

Aspects of the invention provide a driving circuit of an electro-optical panel that can include a plurality of power lines, a signal line, a driving device, and a protective circuit. The driving device can drive the electro-optical panel based on powers supplied from a power-supply circuit through the plurality of power lines and various signals input through the signal line. The protective circuit is provided between at least two power lines among the plurality of power lines, to which powers of different potentials are supplied, and can include an electrical path for dissipating static applied to one of the two power lines to the other. Accordingly, the driving circuit can increase resistance to static of an electro-optical apparatus, such as a liquid crystal apparatus.

20 Claims, 11 Drawing Sheets

FOREIGN PATENT DOCUMENTS

| | | |
|---|---|---|
| JP | A-4-168476 | 6/1992 |
| JP | A-7-294952 | 11/1995 |
| JP | A 8-22024 | 1/1996 |
| JP | A-8-262401 | 10/1996 |
| JP | A-10-90650 | 4/1998 |
| JP | A 10-303431 | 11/1998 |
| JP | A-11-087624 | 3/1999 |
| JP | A 11-231345 | 8/1999 |
| JP | B2 3029531 | 2/2000 |
| JP | A-2001-22326 | 1/2001 |
| JP | B2 3241708 | 10/2001 |
| JP | A-2002-55647 | 2/2002 |
| JP | B2 3348734 | 9/2002 |
| JP | A-2003-149668 | 5/2003 |
| KR | 166509 | 1/1999 |
| KR | 271093 B | 2/2000 |
| KR | 303716 | 10/2001 |
| WO | WO 00/44049 | 7/2000 |

\* cited by examiner

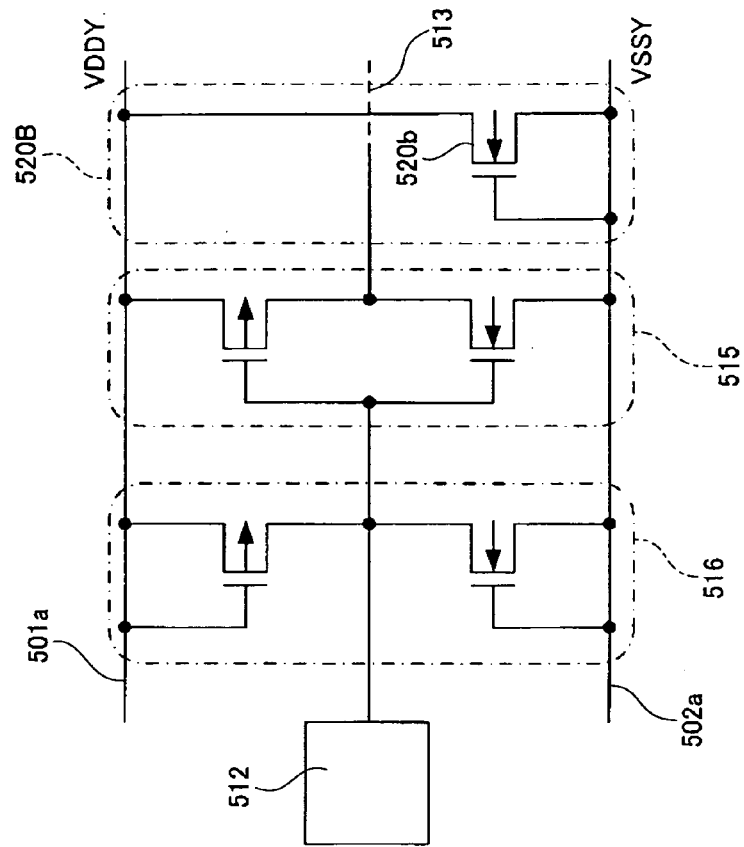
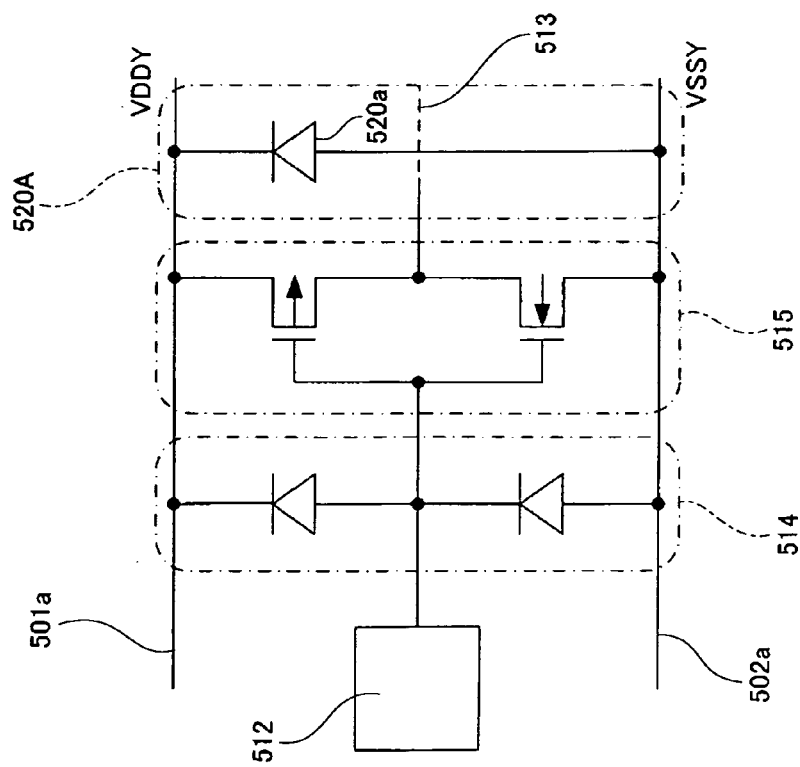
FIG. 6B
FIG. 6A

DRIVING CIRCUIT, METHOD FOR PROTECTING THE SAME, ELECTRO-OPTICAL APPARATUS, AND ELECTRONIC APPARATUS

BACKGROUND OF THE INVENTION

1. Field of Invention

Aspects of the invention relate to a driving circuit for driving an electro-optical panel, such as a liquid crystal panel, a method for protecting the same, an electro-optical apparatus, such as a liquid crystal apparatus, including the electro-optical panel and the driving circuit, and an electronic apparatus, such as a liquid crystal projector, including the electro-optical apparatus.

2. Description of Related Art

This type of driving circuit can be incorporated into a substrate of an electro-optical panel so as to serve as an internal circuit for driving scanning lines and data lines by using externally supplied power, or is attached to the substrate so as to serve as an external IC circuit. Such a driving circuit may be deteriorated or destroyed for various reasons: temperature, humidity and mechanical impact during a mounting or assembling step in a process of manufacturing the driving circuit or an electro-optical apparatus including the same, at shipment or while being stored, and while the product is being used after shipment. In particular, a problem is destruction caused by a stress of electrostatic discharge, i.e., electrostatic destruction, which occurs while the electro-optical apparatus is being assembled or transported. While the driving circuit or the electro-optical apparatus is being assembled, static is generated around the circuit or apparatus. When the static is applied to wiring connected to the driving circuit, the driving circuit is deteriorated or destroyed. As a result, manufacturing yield reduces and breakdown of products after shipment occurs.

In order to prevent such deterioration and destruction of the driving circuit caused by static, a protective circuit can be provided for a signal path through which a signal is input/output in the driving circuit. See, for example, Japanese Examined Patent Application Publication No. 3-54475, Japanese Unexamined Patent Application Publication No. 11-231345, Japanese Unexamined Utility Model Registration Application Publication No. 64-3827, Japanese Unexamined Patent Application Publication No. 8-22024, and Japanese Unexamined Patent Application Publication No. 10-303431. More specifically, the protective circuit can be provided as an input protective circuit for an input terminal, to which various signals including clock signals, inversion clock signals, and start pulses are input from the outside of the driving circuit. Alternatively, the protective circuit can be provided as an output protective circuit for an output terminal, through which various signals including scanning signals and end pulses are output to the outside of the driving circuit.

Since the above-described driving circuit is driven by a power-supply voltage, the driving circuit can be provided with a power line serving as a power-supplying path for supplying the power-supply voltage, as well as the above-described signal path. On the other hand, the above-described protective circuit is provided for the input/output terminals for various signals including clock signals, but the protective circuit is not provided for the power-supplying path. Therefore, in this driving circuit, the resistance of an internal circuit to static, which may be applied to the power-supplying path while the electro-optical apparatus is being assembled or transported, is weak. As a result, the driving circuit may be deteriorated or destructed by static applied to the power-supplying path.

Particularly, if the wiring capacitance in the power line is large, this problem may not become evident. However, as a pixel pitch becomes smaller or as a driving frequency becomes higher under a recent requirement for improvement in image quality, the above-described problem will become increasingly serious due to a decrease in the wiring capacitance of the power line.

SUMMARY OF THE INVENTION

Aspects of the invention can provide a driving circuit for an electro-optical panel, which is highly resistant to static electricity, a method for protecting the driving circuit, an electro-optical apparatus including the electro-optical panel and the driving circuit; and various electronic apparatuses including the electro-optical apparatus.

An aspect of the invention provides a driving circuit for driving an electro-optical panel including an image display area provided with a plurality of pixel portions by using powers of different potentials supplied from a power-supply circuit. The driving circuit includes a plurality of power lines through which the powers are supplied from the power-supply circuit, a signal line through which various signals for driving the electro-optical panel are supplied; driving device for driving the electro-optical panel based on the powers supplied through the plurality of power lines and the various signals input through the signal line, and a protective circuit which is provided between at least two of the plurality of power lines, through which powers of different potentials are supplied, and which includes an electrical path for dissipating static applied to one of the two power lines to the other, so as to protect the driving device against the static.

According to the driving circuit of the invention, the driving device drives the electro-optical panel by using the powers of different potentials supplied from the power-supply circuit through the plurality of power lines, when the driving circuit is operated. More specifically, the driving circuit can generate driving signals for driving the electro-optical panel based on various signals supplied from the signal line and outputs the generated driving signals to the electro-optical panel, so as to drive the electro-optical panel.

In the exemplary driving circuit of the invention, a protective circuit for protecting the driving device against static, which is generated near the driving device while the driving circuit is being assembled, transported, or operated, is provided for the plurality of power lines serving as a power-supplying path. Therefore, according to the driving circuit of the invention, an accidental voltage which is caused by static applied to the plurality of power lines and which is generated among the plurality of power lines can be diffused and eliminated through an electrical path included in the protective circuit. Accordingly, in the driving circuit of the invention, deterioration or destruction of the driving device, caused by static which is generated while the driving circuit is being assembled, transported, or operated and which is applied on the plurality of power lines, can be prevented. As a result, the static resistance can be increased.

In the driving circuit of the invention, the protective circuit can protect the driving device by being energized so that the potentials on the two power lines are maintained in a predetermined relationship when the static is applied to the two power lines.

Accordingly, the protective circuit is energized so that the potentials on the power lines corresponding to the protective circuit are maintained in a predetermined relationship when the driving circuit of the invention is being driven. Therefore, the driving device can drive the electro-optical panel while being protected by the protective circuit and hardly being affected by the energized protective circuit in both cases where the driving circuit is not operated and operated.

In the case where the protective circuit is energized so that the potentials on the power lines corresponding to the protective circuit are maintained in a predetermined relationship, the protective circuit may include a diode or a diode-connected semiconductor device serving as at least part of the electrical path. With this configuration, the protective circuit may have a relatively simple configuration. Preferably, the diode is provided between power lines corresponding to the protective circuit in the following way. That is, the anode of the diode can be electrically connected to a low-potential-side power line of the two power line corresponding to the protective circuit, and the cathode thereof is electrically connected to a high-potential-side power line. Also, the diode-connected semiconductor device is preferably provided between the power lines corresponding to the protective circuit, as in the diode.

While the driving circuit is not receiving power and is not being operated (e.g., while being assembled), if static of a higher potential than that of a high-potential-side power line, which is usually inconstant or at a ground potential, is applied to the low-potential-side power line of the power lines corresponding to the protective circuit, the static is discharged to the high-potential-side power line by the diode or semiconductor device. Also, if static of a lower potential than that of the low-potential-side power line, which is usually inconstant or at a ground potential, is applied to the high-potential-side power line of the power lines corresponding to the protective circuit, the static is discharged to the low-potential-side power line by the diode or semiconductor device. In this way, static applied to the power line corresponding to the protective circuit while the driving circuit is not being operated (e.g. while being assembled) can be efficiently dissipated by the electrical path in the protective circuit.

On the other hand, while the driving circuit is being operated, that is, while power is being supplied, if static of a higher potential than that of power supplied to the high-potential-side power line is applied to the low-potential-side power line, the static is discharged to the high-potential-side power line by the diode or semiconductor device. Also, if static of a lower potential than that of power supplied to the low-potential-side power line is applied to the high-potential-side power line of the power lines corresponding to the protective circuit, the static is discharged to the low-potential-side power line by the diode or semiconductor device. In this way, static applied to the power line corresponding to the protective circuit while the driving circuit is being operated can be efficiently dissipated by the electrical path in the protective circuit.

Also, in the case where the protective circuit is energized so that the potentials on the power lines corresponding to the protective circuit are maintained in a predetermined relationship, the protective circuit may include an N-type transistor, a P-type transistor, or a PIN junction transistor. With this configuration, the protective circuit including a diode-connected semiconductor element may have a relatively simple configuration. More specifically, in the protective circuit, the source and gate electrodes of the transistor are electrically connected to a low-potential-side power line of two power lines corresponding to the protective circuit, and the drain electrode of the transistor is electrically connected to a high-potential-side power line.

Alternatively, in the driving circuit of the invention, the protective circuit can include a resistor serving as at least part of the electrical path. With this configuration, in the protective circuit, the resistor is electrically connected between two power lines corresponding to the protective circuit. Also, the resistor diffuses and discharges static applied to one of the power lines to the other power line. Accordingly, with the configuration, static applied to the power line corresponding to the protective circuit can be efficiently dissipated by the electrical path included in the protective circuit in both cases where the driving circuit is not being operated (e.g. while being assembled) and is being operated.

When the exemplary protective circuit includes the resistor, the resistance of the resistor may be set so that the value of a current flowing between the two power lines is 10% or less of the value of a current consumed as the supplied powers. With this configuration, even if the protective circuit includes a resistor, a driving operation in the driving device is not interfered while the driving circuit is being operated. More specifically, changes in voltage in the power lines (for example, voltage drop in the high-potential side or voltage rise in the low-potential side) do not cause current abnormality for the driving device.

Also, in the exemplary driving circuit of the invention, the two power lines include at least one of a highest power line for supplying power of the highest potential and a lowest power line for supplying power of the lowest potential among the plurality of power lines, and the electrical path includes at least one of a path to the highest power line and a path to the lowest power line. With this configuration, the protective circuit maintains the potentials on the corresponding power lines in a range of the highest potential and the lowest potential of the powers supplied from the power-supply circuit. Therefore, while the driving circuit is being operated, the potentials on the plurality of the power lines can be maintained in a range of the highest potential and the lowest potential.

In the exemplary driving circuit of the invention, the protective circuit can include the electrical path so as to protect the driving device and/or the electro-optical panel. In this configuration, the electro-optical panel is driven by powers supplied from the power-supply circuit through the plurality of power lines. Therefore, by diffusing and eliminating a voltage which is caused by static applied to the plurality of power lines and which is generated among the plurality of power lines through the electrical path included in the protective circuit, the driving device and/or the electro-optical panel can be protected. Accordingly, the static resistance of the electro-optical panel can be increased.

Also, in the exemplary driving circuit of the invention, the protective circuit can include another electrical path for dissipating static applied to the signal line in at least one of an input-terminal side and an output-terminal side of the driving device, so as to protect the driving device against the static applied to the signal line. With this configuration, static applied to the signal line for supplying various signals is prevented from being applied to the driving device. Therefore, deterioration or destruction of the driving device caused by static applied to the plurality of power lines and signal line can be prevented.

Further, in the exemplary driving circuit of the invention, the protective circuit further can include an electrical path which is provided between at least one of the plurality of power lines and the driving device or the signal line and which dissipates static applied to one of the one power line and the driving device or the signal line to the other, so as to protect the driving means against the static. With this configuration, at least one of the plurality of power lines can be selected, and an accidental voltage generated between the power line and the driving device or the signal line due to static applied to the power line can be eliminated through the electrical path included in the protective circuit. Therefore, at least one of the plurality of power lines is selected, and deterioration or destruction caused by static applied to the power line can be prevented.

Also, an exemplary electro-optical apparatus of the invention can include the above-described driving circuit and the electro-optical panel of the present invention. According to the electro-optical apparatus of the invention, static resistance can be increased. Therefore, manufacturing yield of the electro-optical apparatus can be increased, and destruction of the apparatus after shipment can be prevented.

Also, in order to solve the above-described problems, an exemplary electronic apparatus of the invention includes the above-described electro-optical apparatus of the invention. The electronic apparatus of the invention can include the above-described electro-optical apparatus of the invention. Therefore, various electronic apparatuses in which manufacturing yield can be increased and destruction after shipment can be prevented can be realized. The various electronic apparatuses include: projection display apparatuses, liquid crystal television sets, mobile phones, electronic notepads, word processors, view-finder or monitor direct-view videotape recorders, work stations, television telephones, POS terminals, and touch panels. Also, as the electronic apparatus of the invention, electrophoretic devices, such as electronic paper, can be realized.

Aspects of the invention can provide a method for protecting a driving circuit including: (i) a plurality of power lines through which powers are supplied from a power-supply circuit; (ii) a signal line through which various signals, for driving an electro-optical panel including an image display area provided with a plurality of pixel portions, are supplied; and (iii) driving device for driving the electro-optical panel by using the powers supplied through the plurality of power lines based on the various signals input through the signal line. The driving device can be protected against static by providing an electrical path between at lest two of the plurality of power lines, to which powers of different potentials are supplied, the electrical path dissipating static applied to one of the two power lines to the other.

According to the method for protecting a driving circuit of the invention, as in the above-described driving circuit of the invention, deterioration or destruction of the driving device caused by static applied to the plurality of power lines can be prevented, and the static resistance can be increased.

BRIEF DESCRIPTION OF THE DRAWINGS

The invention will be described with reference to the accompanying drawings, wherein like numerals reference like elements, and wherein:

FIG. 6(a) is an exemplary circuit diagram showing an example of the configuration of an electrical path in a Y inter-power-supply protective circuit 135 according to the embodiment of the present invention, and FIG. 6(b) is an exemplary circuit diagram showing another example of the configuration of the electrical path;

DETAILED DESCRIPTION OF PREFERRED EMBODIMENTS

The functions and further advantages of the invention will become apparent from the following description of the preferred embodiment.

Hereinafter, an exemplary embodiment of the invention will be described with reference to the drawings. In the following embodiment, an exemplary electro-optical apparatus of the invention is applied to a liquid crystal apparatus of a TFT active matrix driving method.

Figure 1:
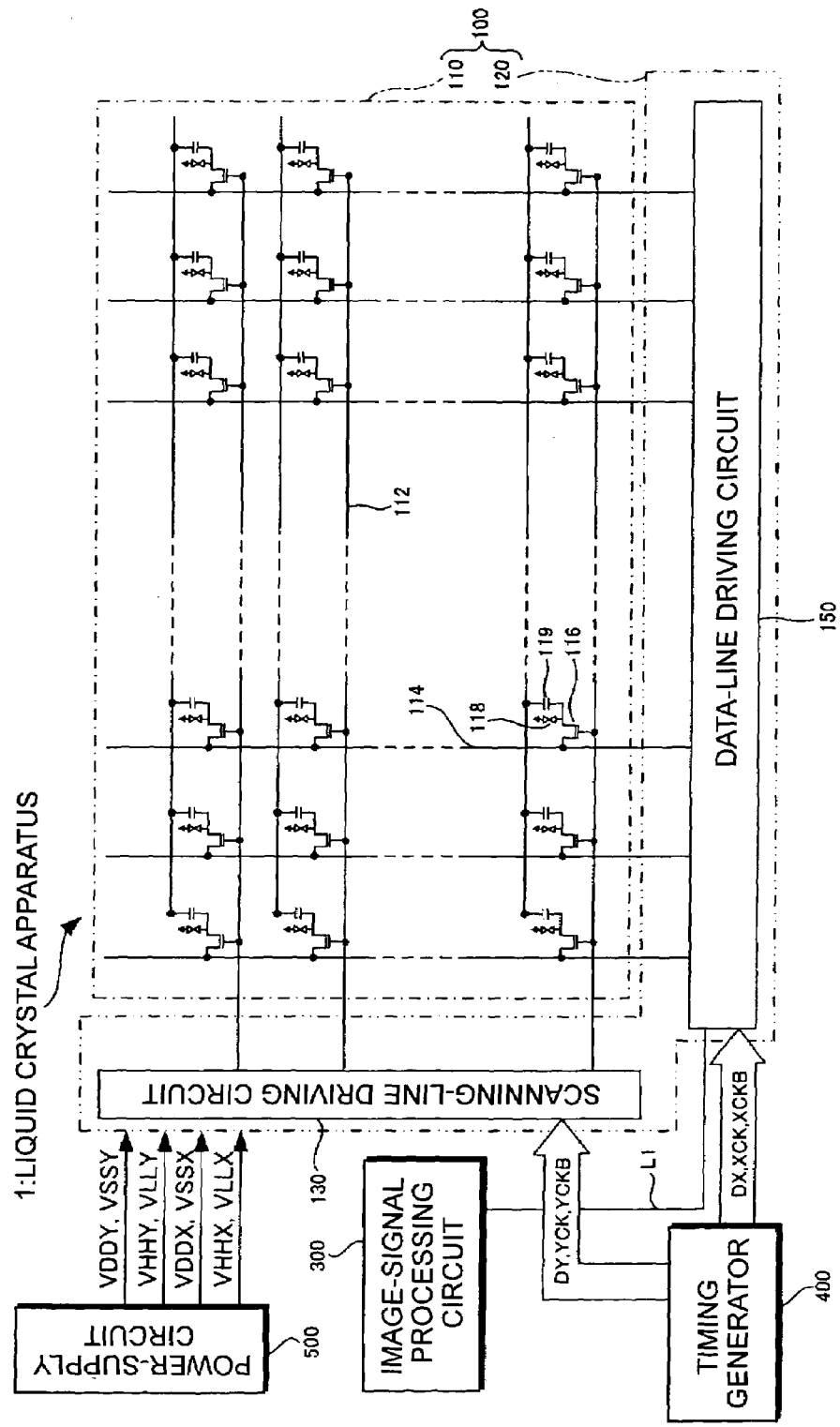
FIG. 1 is an exemplary block diagram showing the entire configuration of a liquid crystal apparatus according to an embodiment of the invention.

First, the entire configuration of the electro-optical apparatus according to the invention will be described with reference to FIG. 1. FIG. 1 is an exemplary block diagram showing the entire configuration of a liquid crystal apparatus 1 according to the embodiment.

As shown in FIG. 1, the liquid crystal apparatus 1 can include a liquid crystal panel 100, serving as a main part and as an example of the electro-optical panel according to the invention, an image-signal processing circuit 300, a timing generator 400, and a power-supply circuit 500.

The liquid crystal panel 100 can include an element substrate provided with TFTs 116 serving as switching elements for pixel switching and pixel electrodes 118, and an opposing substrate provided with opposing electrodes, these substrates defining an image display area 110. The substrates are bonded to each other with predetermined space therebetween such that their electrode-formed surfaces face each other, and liquid crystal is sandwiched therebetween.

The timing generator 400 outputs various timing signals used in each unit. The timing generator 400 can include a timing-signal output device, which generates a dot clock serving as a clock of minimum unit and scanning each pixel. Also, Y clock signal YCK, inversion Y clock signal YCKB, X clock signal XCK, inversion X clock signal XCKB, Y transfer-starting pulse DY, and X transfer-starting pulse DX are generated based on the dot clock.

The image-signal processing circuit 300 externally receives input image data, generates image signals based on the input image data, and supplies the image signals to the liquid crystal panel 100 through an image-signal supplying line L1. Herein, the image signal expresses black-and-white gray scale for simplification, but the present invention is not limited to this, but the image signal may consist of R signal, G signal, and B signal corresponding to RGB colors. In that case, three image-signal supplying lines are provided.

The power-supply circuit 500 generates powers of a plurality of potentials and supplies the powers to the liquid crystal panel 100. Details of the power-supply circuit 500 will be described later.

In the embodiment, the liquid crystal panel 100 can include a driving circuit therein. As an example of the driving circuit according to the present invention, a driving circuit 120 including a scanning-line driving circuit 130 and a data-line driving circuit 150 is provided on the element substrate. Preferably, the driving circuit 120 is incorporated near the element substrate together with the TFT 116 corresponding to each pixel, which is incorporated in the image display area 110. Alternatively, at least part of the driving circuit may be formed as an external IC, which may be attached near the element substrate.

The liquid crystal panel 100 can further include data lines 114 and scanning lines 112, which are aligned in the vertical and horizontal directions in the image display area 110 at the center of the element substrate. Also, the pixel electrodes 118 and the TFTs 116 for switching-controlling the pixel electrodes 118, which are arranged in a matrix pattern, are provided in the respective pixels corresponding to intersections of the data lines and scanning lines. In the embodiment, the number of scanning lines 112 is m (m is a natural number of 2 or more) and the number of data lines 114 is n (n is a natural number of 2 or more).

The data-line driving circuit 150 sequentially supplies image signals supplied through the image-signal supplying line L1 to each data line 114. In each TFT 116, the source electrode is electrically connected to the data line 114, to which image signals are supplied from the data-line driving circuit 150, the gate electrode is electrically connected to the scanning line 112, to which scanning signals (described later) are supplied, and the drain electrode is connected to the pixel electrode 118. Each pixel portion includes the pixel electrode 118, a common electrode provided on the opposing substrate, and liquid crystal sandwiched by these electrodes. Accordingly, the pixels are arranged in a matrix pattern while corresponding to intersections of the scanning lines 112 and the data lines 114.

In order to prevent leakage of held image signals, a storage capacitor 119 can be provided in parallel with a liquid crystal capacitor, which is formed between the pixel electrode 118 and the opposing electrode. For example, the voltage of the pixel electrode 118 is stored in the storage capacitor 119 for a longer time by three digits than a period in which a source voltage is applied. Therefore, a storage characteristic can be improved and a high-contrast ratio can be realized.

Figure 2:
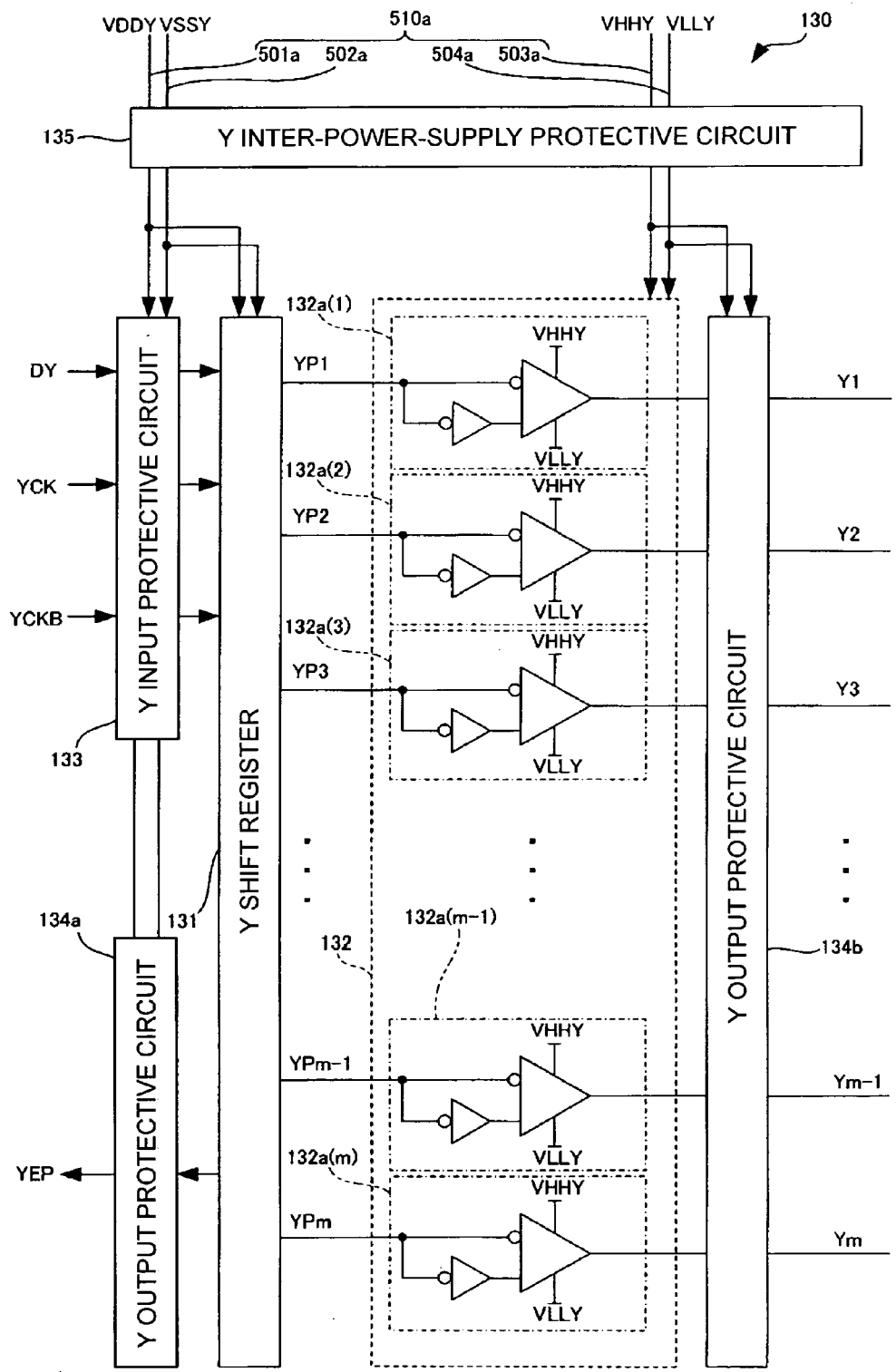
FIG. 2 is an exemplary block diagram showing the configuration of a scanning-line driving circuit according to the embodiment of the invention.

Next, a specific configuration of the scanning-line driving circuit 130 of the driving circuit 120 will be described with reference to FIG. 2. FIG. 2 is an exemplary block diagram showing the configuration of the scanning-line driving circuit 130. The main part of the scanning-line driving circuit 130 can include a Y shift register 131 and a Y level shifter 132. The Y shift register 131 and the Y level shifter 132 of the scanning-line driving circuit 130 form driving device according to the invention.

A Y clock signal YCK, an inversion Y clock signal YCKB, and a Y transfer-starting pulse DY are input from the timing generator 400 to the Y shift register 131. When the Y transfer-starting pulse DY is input to the Y shift register 131, the Y shift register 131 sequentially generates Y transfer pulses YP1, YP2, YP3, . . . , YPm−1, and YPm in synchronization with the Y clock signal YCK and the inversion Y clock signal YCKB. Although not shown in FIG. 2, the Y shift register 131 consists of m stages corresponding to the m scanning lines 112. The Y transfer pulses YP1, YP2, YP3, . . . , YPm−1, and YPm are sequentially output from each stage, in the direction from the first stage toward the m-th stage. Additionally, the Y transfer pulse YPm is output from the last stage of the Y shift register 131 as a Y end pulse YEP of the Y shift register 131.

As shown in FIG. 2, the Y level shifter 132 consists of m stages corresponding to the m scanning lines 112, and each stage can include an amplifier circuit 132$a$(i) (herein, i=1, 2, . . . , and m). The Y transfer pulses YP1, YP2, YP3, . . . , YPm−1, and YPm, which are sequentially output from the Y shift register 131, are input to the amplifier circuits 132$a$(1), 132$a$(2), 132$a$(3), . . . , 132$a$(m−1), and 132$a$(m) of the Y level shifter 132. The Y level shifter 132 shifts the voltage level of the pulses, and then sequentially outputs Y driving signals Y1, Y2, Y3, . . . , Ym−1, and Ym.

The power-supply circuit 500 shown in FIG. 1 supplies a first Y power VDDY, a second Y power VSSY, a third Y power VHHY, and a fourth Y power VLLY to the scanning-line driving circuit 130. In other words, as shown in FIG. 2, the scanning-line driving circuit 130 includes a Y power line group 510$a$ including: a first Y power line 501$a$ for supplying the first Y power VDDY, a second Y power line 502$a$ for supplying the second Y power VSSY, a third Y power line 503$a$ for supplying the third Y power VHHY, and a fourth Y power line 504$a$ for supplying the fourth Y power VLLY.

As shown in FIG. 2, the Y shift register 131 is electrically connected to the first Y power line 501$a$ and the second Y power line 502$a$. In other words, the Y shift register 131 is driven by the first Y power VDDY and the second Y power VSSY. The voltage of each of the Y transfer pulses YP1, YP2, YP3, . . . , YPm−1, and YPm is equal to a voltage between the potentials of the first Y power VDDY and the second Y power VSSY.

As shown in FIG. 2, the Y level shifter 132 is electrically connected to the third Y power line 503$a$ and the fourth Y power line 504$a$. Also, in the Y level shifter 132, the amplifier circuits 132$a$(i) are driven by the third Y power VHHY and the fourth Y power VLLY. That is, the Y level shifter 132 shifts the voltage of each of the Y transfer pulses YP1, YP2, YP3, . . . , YPm−1, and YPm, from the voltage between the potentials of the first Y power VDDY and the second Y power VSSY to a voltage between the potentials of the third Y power VHHY and the fourth Y power VLLY.

In the liquid crystal apparatus 1, if static is generated in the driving circuit 120 or wiring connected thereto while the apparatus is not being operated (for example, while the liquid crystal panel 100 is being assembled or transported) or while the apparatus is being operated by supplied power, and if the generated static is applied to the Y shift register 131 and the Y level shifter 132 of the scanning-line driving circuit 130 of the driving circuit 120, part or whole of the Y shift register 131 and the Y level shifter 132 may be destructed or deteriorated.

In the scanning-line driving circuit 130, a protective circuit is provided for at least one of an input terminal side, through which signals are input from the outside to the scanning-line driving circuit 130, and an output terminal side, through which signals are output from the scanning-line driving circuit 130. Also, a protective circuit is provided for the Y power line group 510a. In FIG. 2, a protective circuit provided for the input terminal side is shown as a Y input protective circuit 133, protective circuits provided for the output terminal side are shown as Y output protective circuits 134a and 134b, and a protective circuit provided for the Y power line group 510a is shown as a Y inter-power-supply protective circuit 135.

In FIG. 2, the Y input protective circuit 133 is provided for a signal line through which the Y clock signal YCK, the inversion Y clock signal YCKB, and the Y transfer-starting pulse DY are input, the Y output protective circuit 134a is provided for a signal line through which the Y end pulse YEP is output; and the Y output protective circuit 134b is provided for a signal line through which the Y driving signals Y1, Y2, Y3, . . . , Ym−1, and Ym are output.

In the embodiment, one inter-power-supply protective circuit may be provided for the Y power line group 510a and an X power line group 510b (described later). The configuration of the inter-power-supply protective circuit in this case will be described later.

Figure 3:
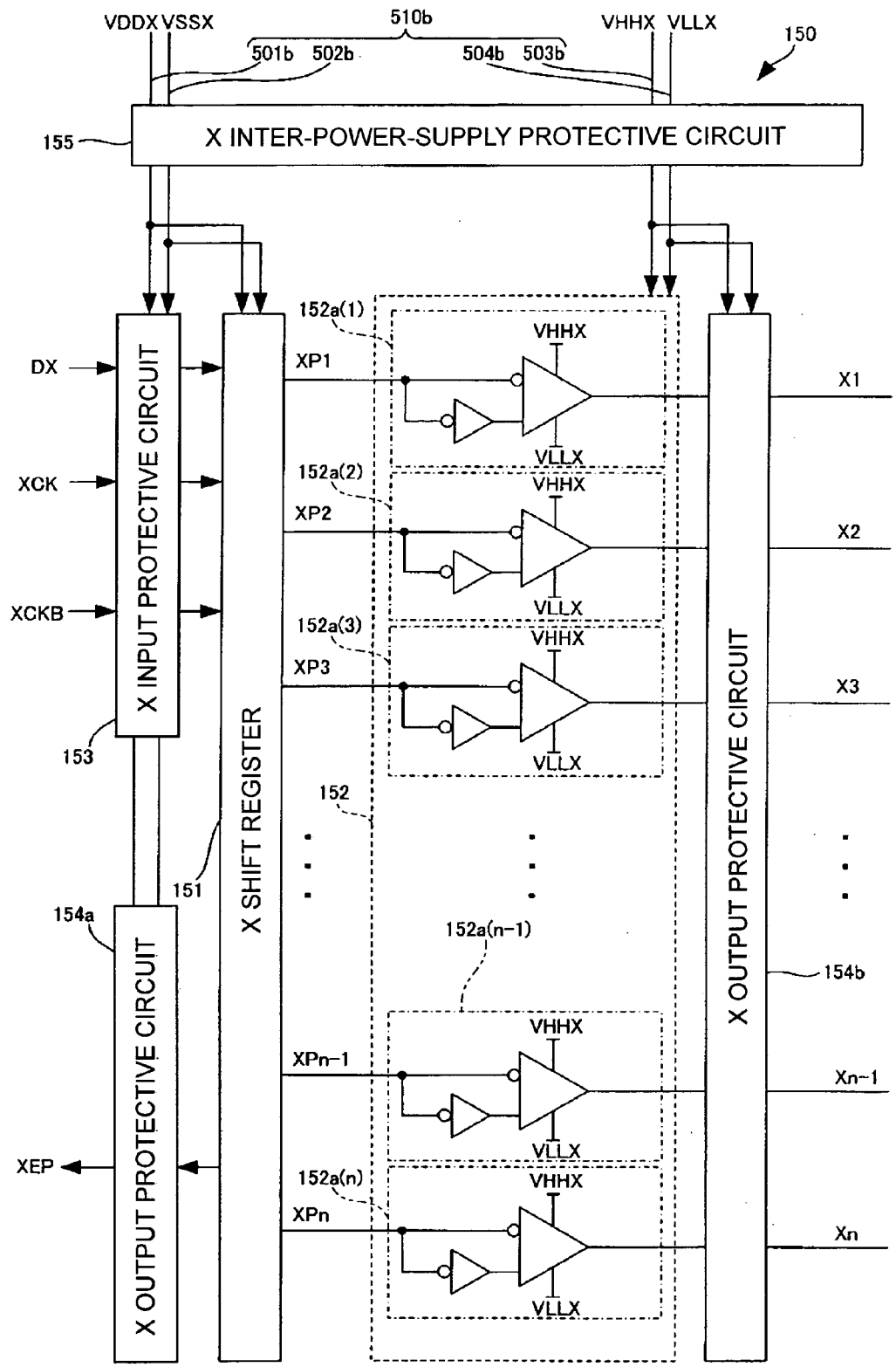
FIG. 3 is an exemplary block diagram showing the configuration of a data-line driving circuit according to the embodiment of the invention.

Next, a specific configuration of the data-line driving circuit 150 of the driving circuit 120 will be described with reference to FIG. 3. FIG. 3 is an exemplary block diagram showing the configuration of the data-line driving circuit 150. The main part of the data-line driving circuit 150 includes an X shift register 151 and an X level shifter 152. The X shift register 151 and the X level shifter 152 of the data-line driving circuit 150 form the driving means according to the invention.

The X shift register 151 has the same configuration as that of the Y shift register 131 shown in FIG. 2, and operates in the same way. Although not shown in FIG. 3, the X shift register 151 consists of n stages corresponding to the n data lines 114. When an X clock signal XCK, an inversion X clock signal XCKB, and an X transfer-starting pulse DX are input from the timing generator 400 to the X shift register 151, the X shift register 151 sequentially generates X transfer pulses XP1, XP2, XP3, . . . , XPn−1, and XPn in synchronization with the X clock signal XCK and the inversion X clock signal XCKB, in the direction from the first stage toward the n-th stage. Additionally, the X transfer pulse XPn is output from the last stage of the X shift register 151 as an X end pulse XEP.

The X level shifter 152 has the same configuration as that of the Y level shifter 132 shown in FIG. 2. The X level shifter 152 consists of n stages corresponding to the n data lines 114, and each stage includes an amplifier circuit 152a(j) (herein, j=1, 2, . . . , and n), as the amplifier circuit 132a(i) shown in FIG. 2. The X level shifter 152 shifts the voltage level of the X transfer pulses XP1, XP2, XP3, . . . , XPn−1, and XPn, and then sequentially outputs X driving signals X1, X2, X3, . . . , Xn−1, and Xn. Incidentally, image signals from the data-line driving circuit 150 are sequentially supplied to the data lines 114 in accordance with the timing when the X driving signals X1, X2, X3, . . . , Xn−1, and Xn are output from the X level shifter 152.

As in the scanning-line driving circuit 130 shown in FIG. 2, four types of powers are supplied from the power-supply circuit 500 to the data-line driving circuit 150, and the X power line group 510b, which includes four power lines corresponding to the four types of powers, is provided in the data-line driving circuit 150.

The X shift register 151 is driven by a first X power VDDX and a second X power VSSX supplied from the power-supply circuit 500 through a first X power line 501b and a second X power line 502b. Therefore, the voltage of each of the X transfer pulses XP1, XP2, XP3, . . . , XPn−1, and XPn is equal to a voltage between the potentials of the first X power VDDX and the second X power VSSX.

The X level shifter 152 is driven by a third X power VHHX and a fourth X power VLLX supplied from the power-supply circuit 500 through a third X power line 503b and a fourth X power line 504b. That is, the X level shifter 152 shifts the voltage of each of the X transfer pulses XP1, XP2, XP3, . . . , XPn−1, and XPn, from the voltage between the potentials of the first X power VDDX and the second X power VSSX to a voltage between the potentials of the third X power VHHX and the fourth X power VLLX.

Further, as in the scanning-line driving circuit 130, the data-line driving circuit 150 is provided with an X input protective circuit 153, X output protective circuits 154a and 154b, and an X inter-power-supply protective circuit 155. In FIG. 3, the X input protective circuit 153 is provided for a signal line through which the X clock signal XCK, the inversion X clock signal XCKB, and the X transfer-starting pulse DX are input; the X output protective circuit 154a is provided for a signal line through which the X end pulse XEP is output; and the X output protective circuit 154b is provided for a signal line through which the X driving signals X1, X2, X3, . . . , Xn−1, and Xn are output.

Next, the configuration and operation of the Y input protective circuit 133, the Y output protective circuits 134a and 134b, and the Y inter-power-supply protective circuit 135 shown in FIG. 2; and those of the X input protective circuit 153, the X output protective circuits 154a and 154b, and the X inter-power-supply protective circuit 155 shown in FIG. 3, will be described.

Figure 4:
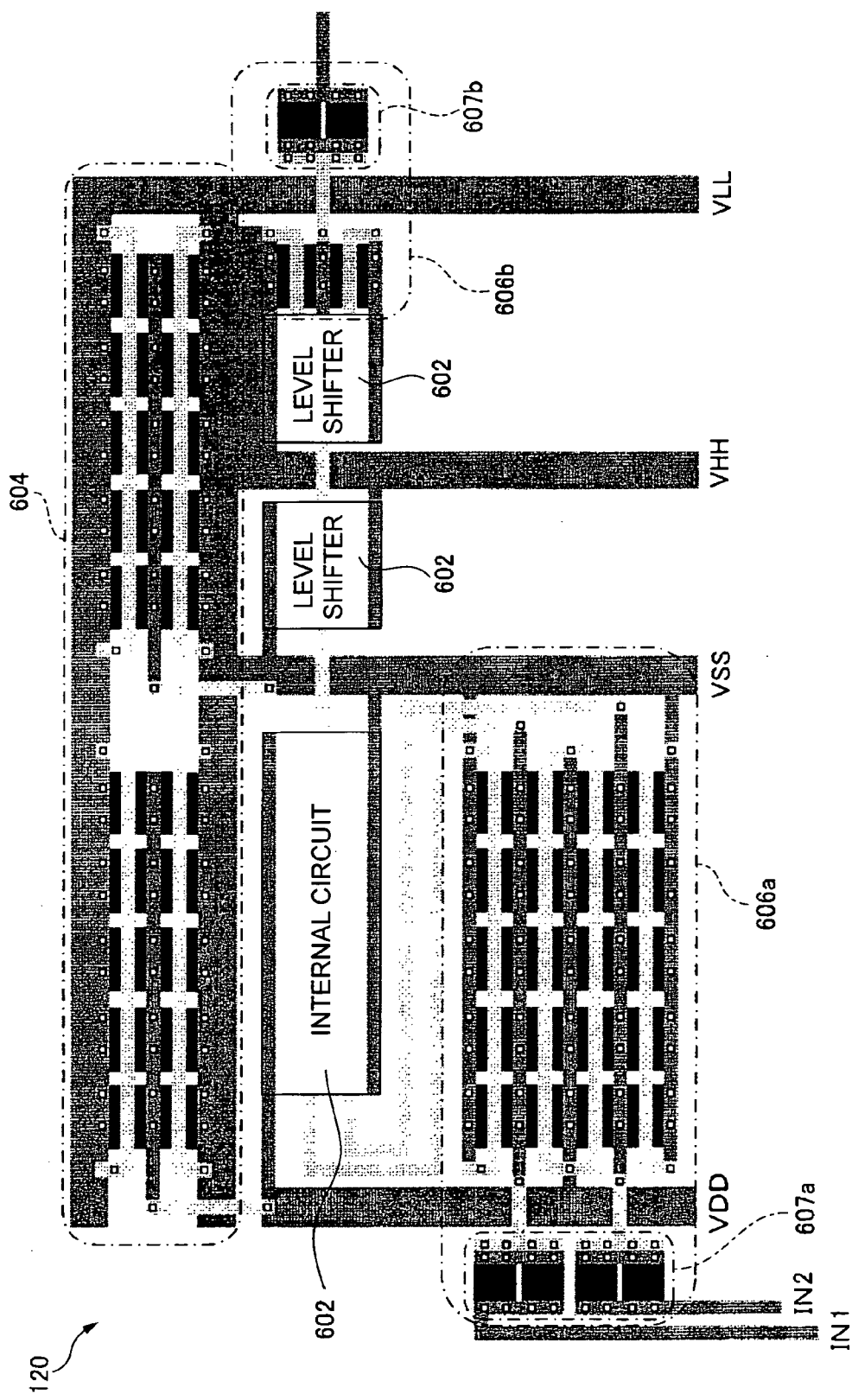
FIG. 4 schematically shows the layout of a driving circuit according to the embodiment of the invention.

In the exemplary embodiment, the potentials of the four types of powers supplied from the power-supply circuit 500 to the scanning-line driving circuit 130 increase in order of the fourth Y power VLLY, the second Y power VSSY, the first Y power VDDY, and the third Y power VHHY. Also, the potentials of the four types of powers supplied from the power-supply circuit 500 to the data-line driving circuit 150 increase in order of the fourth X power VLLX, the second X power VSSX, the first X power VDDX, and the third X power VHHX. Further, among the potentials of the eight types of powers supplied from the power-supply circuit 500 to the scanning-line driving circuit 130 and the data-line driving circuit 150, the potentials of the second Y power VSSY and the second X power VSSX are equal to each other, and the potentials of the first Y power VDDY and the first X power VDDX are equal to each other. Further, the potentials increase in order of the fourth Y power VLLY, the fourth X power VLLX, the second Y power VSSY (the second X power VSSX), the first Y power VDDY (the first X power VDDX), the third X power VHHX, and the third Y power VHHY Now, an outward configuration of the driving circuit 120 will be described with reference to FIG. 4. FIG. 4 shows a schematic layout of the driving circuit 120 including each protective circuit, which has been described with reference to FIGS. 2 and 3.

In FIG. 4, each circuit forming the driving device of the invention, which has been described with reference to FIGS. 2 and 3, is denoted by reference numeral 602. Also, the input protective circuits and the output protective circuits described with reference to FIGS. 2 and 3 are shown as an input protective circuit 606a and an output protective circuit 606b, respectively. As shown in FIG. 4, in the input protective circuit 606a and the output protective circuit 606b, protective resistor circuits 607a and 607b, each including a diode or a diode-connected semiconductor device (described below), are provided in the signal input side and output side, respectively.

As shown in FIG. 4, an inter-power-supply protective circuit 604 and the input/output protective circuits 606a and 606b are provided near the driving device 602 in the driving circuit 120. That is, according to the embodiment, the inter-power-supply protective circuit 604 and the input/output protective circuits 606a and 606b can be provided near the driving circuit 120, and thus space for each protective circuit can be saved.

First, the configuration and operation of each of the Y input protective circuit 133 and the Y output protective circuits 134a and 134b shown in FIG. 2 will be described with reference to FIGS. 2 and 5.

In FIG. 2, the Y input protective circuit 133 is provided for the signal line electrically connected to an input terminal, to which the Y clock signal YCK, the inversion Y clock signal YCKB, and the Y transfer-starting pulse DY are input. The Y input protective circuit 133 includes an electrical path for dissipating static applied to the signal line, so as to protect the Y shift register 131.

The Y output protective circuit 134a is provided for the signal line electrically connected to an output terminal, through which the Y end pulse YEP is output, and includes an electrical path for dissipating static applied to the signal line, so as to protect the Y shift register 131. Likewise, as in the Y output protective circuit 134a, the Y output protective circuit 134b is provided for the signal line through which the Y driving signals Y1, Y2, Y3, . . . , Ym−1, and Ym are output, and includes an electrical path for dissipating static applied to the signal line. The Y output protective circuit 134b protects each pixel portion in the image display area 110 shown in FIG. 1.

Figure 5B:
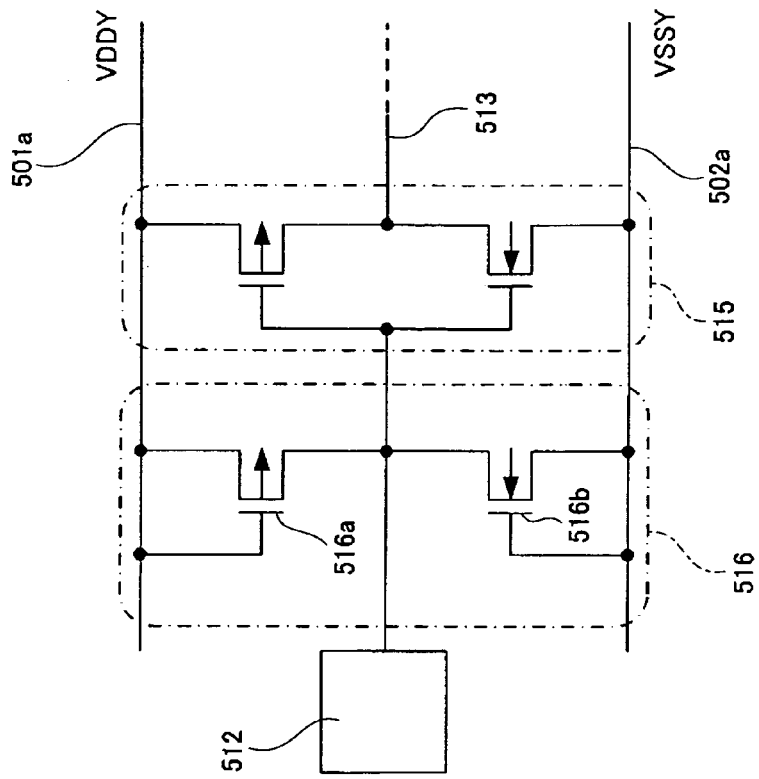
FIG. 5(b) is a circuit diagram showing another example of the configuration of the electrical path.
Figure 5A:
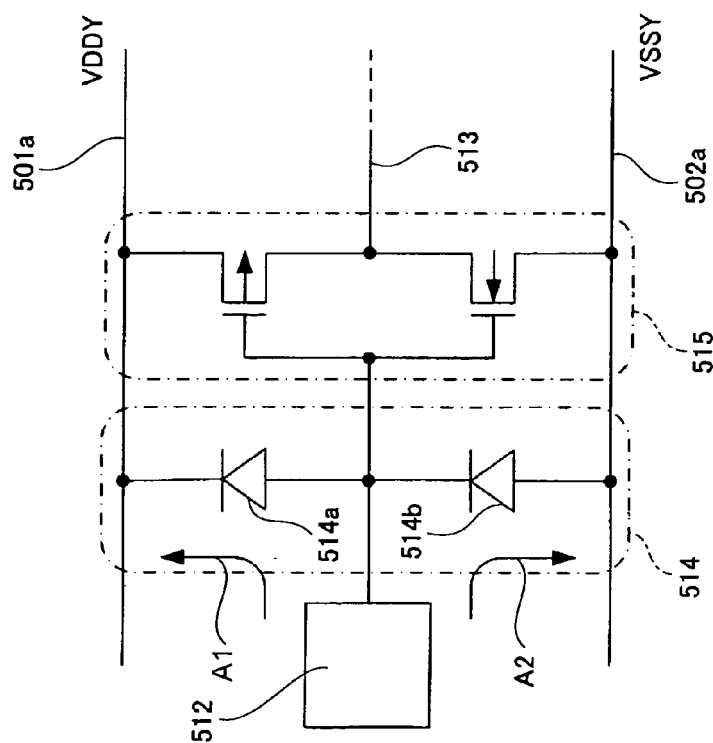
FIG. 5(a) is an exemplary circuit diagram showing an example of the configuration of an electrical path in a Y input protective circuit 133 and Y output protective circuits 134a and 134b according to the embodiment of the present invention.

In the embodiment, the above-described electrical paths in the Y input protective circuit 133 and the Y output protective circuits 134a and 134b have the same configuration. FIG. 5(a) shows an example of the configuration of the electrical path in each of the Y input protective circuit 133 and the Y output protective circuits 134a and 134b, and FIG. 5(b) shows another example thereof.

In FIG. 5(a), an input or output terminal for signals is shown as a terminal 512. Also, an element corresponding to an internal circuit of the Y shift register 131 corresponding to a signal line 513 electrically connected to the terminal 512 or the amplifier circuits 132a(i) in the Y level shifter 132 is denoted by reference numeral 515. That is, the circuit 515 shown in FIG. 5(a) does not show the configuration of the internal circuit of the Y shift register 131 and that of the amplifier circuits 132a(i) in the Y level shifter 132, but shows the electrical connection therebetween.

In FIG. 5(a), an electrical path 514 includes two diodes 514a and 514b.

Referring to FIG. 2, the Y input protective circuit 133 and the Y output protective circuit 134a, which corresponds to the signal line through which the Y end pulse YEP is output, are provided between the first Y power line 501a and the second Y power line 502a. On the other hand, the Y output protective circuit 134b, which corresponds to the signal line through which the Y driving signals Y1, Y2, Y3, . . . , Ym−1, and Ym are output, is provided between the third Y power line 503a and the fourth Y power line 504a.

In the embodiment, the electrical path included in the Y input protective circuit 133 and the electrical path included in the Y output protective circuit 134a are provided between the first Y power line 501a and the second Y power line 502a. Also, the electrical path included in the Y output protective circuit 134b is provided between the third Y power line 503a and the fourth Y power line 504a. In FIG. 5(a), the electrical path 514 is provided between the first Y power line 501a and the second Y power line 502a.

More specifically, in the electrical path 514, the anode of the diode 514a of the two diodes 514a and 514b is electrically connected to the signal line 513, and the cathode thereof is electrically connected to the first Y power line 501a. Also, in the electrical path 514, the anode of the other diode 514b is electrically connected to the second Y power line 502a and the cathode thereof is electrically connected to the signal line 513.

When static of a higher potential than that of the first Y power VDDY is applied from the terminal 512 to the signal line 513, the static is discharged from the signal line 513 to the first Y power line 501a by the diode 514a of the two diodes 514a and 514b in the electrical path 514, as indicated by an arrow A1. Likewise, when static of a lower potential than that of the second Y power VSSY is applied from the terminal 512 to the signal line 513, the static is discharged from the signal line 513 to the second Y power line 502a by the diode 514b in the electrical path 514, as indicated by an arrow A2. Therefore, even if static is applied from the terminal 512 to the signal line 513, the static can be dissipated from the signal line 513 by the electrical path 514, and thus the static is not applied to the circuit 515.

In FIG. 5(b), an electrical path 516 includes two transistors 516a and 516b which are diode-connected to the first Y power line 501a, the second Y power line 502a, and the signal line 513. More specifically, in the electrical path 516, the source electrode of the transistor 516a of the two transistors 516a and 516b is electrically connected to the signal line 513, and the gate and drain electrodes thereof are electrically connected to the first Y power line 501a. On the other hand, the drain electrode of the other transistor 516b is electrically connected to the signal line 513, and the gate and source electrodes thereof are electrically connected to the second Y power line 502a.

Accordingly, in the electrical path 516 shown in FIG. 5(b), the same functions and advantages as in the electrical path 514 shown in FIG. 5(a) can be obtained.

In the exemplary embodiment, by using the Y input protective circuit 133 which includes one of the electrical path 514 shown in FIG. 5(a) and the electrical path 516 shown in FIG. 5(b), static applied to the Y input signal line can be prevented from being applied to the Y shift register 131. Further, by preventing the application of static to the Y shift register 131, indirect application of static to the Y level shifter 132 can be prevented. Therefore, in the scanning-line driving circuit 130, deterioration or destruction of the Y shift register 131 and the Y level shifter 132 caused by static applied to the Y input signal line can be prevented. Likewise, by using the Y output protective circuit 134a, which is provided for the signal line through which the Y end pulse YEP is output, deterioration or destruction of the Y shift register 131 and the Y level shifter 132 caused by static applied to the signal line through which the Y end pulse YEP is output can be prevented, as in the Y input protective circuit 133.

Further, as in the Y input protective circuit 133 and the Y output protective circuit 134a, by using the Y output protective circuit 134b, which is provided for the signal line through which the Y driving signals Y1, Y2, Y3, . . . , Ym−1, and Ym are output, deterioration or destruction of each pixel portion in the image display area 110, caused by static applied to the signal line through which the Y driving signals Y1, Y2, Y3, . . . , Ym−1, and Ym are output, can be prevented.

In the embodiment, the X input protective circuit 153 and the X output protective circuits 154a and 154b shown in FIG. 3 can be formed in the same way as the Y input protective circuit 133 and the Y output protective circuits 134a and 134b. With this configuration, as in the Y side, deterioration or destruction of the X shift register 151, the X level shifter 152, and each pixel portion in the image display area 110, caused by static applied to the input/output signal line, can be prevented in the X side.

Next, the configuration and operation of the Y inter-power-supply protective circuit 135 shown in FIG. 2 will be described with reference to FIGS. 6 to 8.

First, the Y inter-power-supply protective circuit 135 for protecting the Y shift register 131, which is electrically connected to two power lines in the Y power line group 510a shown in FIG. 2, that is, the first Y power line 501a and the second Y power line 502a; or the Y level shifter 132, which is electrically connected to the third Y power line 503a and the fourth Y power line 504a, will be described with reference to FIG. 6.

FIG. 6(a) shows a configuration in which the Y inter-power-supply protective circuit 135 including a diode 520a is added to the configuration shown in FIG. 5(a). FIG. 6(b) shows a configuration in which the Y inter-power-supply protective circuit 135 including a transistor 520b, instead of the diode 520a, is added to the configuration shown in FIG. 5(b). In FIGS. 6(a) and 6(b), parts which are the same as those in FIGS. 5(a) and 5(b) are denoted by the same reference numerals, and the corresponding description will be omitted.

The Y inter-power-supply protective circuit 135 shown in FIG. 6(a) is provided between the first Y power line 501a and the second Y power line 502a, and includes an electrical path 520A for dissipating static applied to one of the first Y power line 501a and the second Y power line 502a to the other. The electrical path 520A includes the diode 520a, which is electrically connected to the first Y power line 501a and the second Y power line 502a.

In FIG. 6(a), the cathode of the diode 520a is electrically connected to the first Y power line 501a and the anode thereof is electrically connected to the second Y power line 502a.

When static of a higher potential than that of the first Y power VDDY is applied to the second Y power line 502a, the static is discharged from the second Y power line 502a to the first Y power line 501a by the diode 520a. Likewise, when static of a lower potential than that of the second Y power VSSY is applied to the first Y power line 501a, the static is discharged from the first Y power line 501a to the second Y power line 502a by the diode 520a. Therefore, even when static is applied to the first Y power line 501a and the second Y power line 502a, an accidental voltage generated between the first Y power line 501a and the second Y power line 502a can be diffused and eliminated through the electrical path 520A.

Therefore, by using the Y inter-power-supply protective circuit 135, deterioration or destruction of the Y shift register 131 caused by static applied to the first Y power line 501a and the second Y power line 502a can be prevented, and thus the resistance to static can be increased.

When the Y inter-power-supply protective circuit 135 protects the Y level shifter 132, the configuration thereof is the same as that shown in FIG. 6(a). Therefore, deterioration or destruction of the Y level shifter 132 caused by static applied to the third Y power line 503a and the fourth Y power line 504a can be prevented, and thus the resistance to static can be increased.

Further, the Y inter-power-supply protective circuit 135 can be energized by the electrical path 520A so that the potentials of the four types of powers in the Y power line group 510a can be maintained in a predetermined relationship even when the liquid crystal panel 100 is being driven. That is, even when the liquid crystal panel 100 is being driven, the scanning-line driving circuit 130 can be operated while hardly being affected by the energized Y inter-power-supply protective circuit 135.

In FIG. 6(b), an electrical path 520B included in the Y inter-power-supply protective circuit 135, which protects the Y shift register 131, includes a transistor 520b which is diode-connected to the first Y power line 501a and the second Y power-line 502a. Incidentally, when the Y inter-power-supply protective circuit 135 protects the Y level shifter 132, the configuration thereof may be the same as that shown in FIG. 6(b).

In FIG. 6(b), the drain electrode of the transistor 502b is electrically connected to the first Y power line 501a, and the source and gate electrodes thereof are electrically connected to the second Y power line 502a. The transistor 520b shown in FIG. 6(b) can operate in the same way as the diode 520a shown in FIG. 6(a). Therefore, when the electrical path 520B is formed by using the transistor 520b instead of the diode 520a, deterioration or destruction of the Y shift register 131 caused by static applied to the first Y power line 501a and the second Y power line 502a can be prevented.

In the embodiment, the X inter-power-supply protective circuit 155 shown in FIG. 3 may have the same configuration as that of the Y inter-power-supply protective circuit 135 described with reference to FIGS. 6(a) and 6(b). Therefore, as in the Y side, the static resistance of the X shift register 151 and the X level shifter 152 can be increased by using the X inter-power-supply protective circuit 155 in the X side. Further, even when the liquid crystal panel 100 is being driven, the data-line driving circuit 150 can be operated while hardly being affected by the energized X inter-power-supply protective circuit 155.

Additionally, the liquid crystal panel 100 is driven by the power supplied from the power-supply circuit 500 through the Y power line group 510a and the X power line group 510b. Therefore, by using the Y inter-power-supply protective circuit 135 and the X inter-power-supply protective circuit 155, deterioration or destruction of part or whole of the liquid crystal panel 100 caused by static applied to the Y power line group 510a or the X power line group 510b can be prevented. As a result, the static resistance of the liquid crystal panel 100 can be increased.

Next, the configuration and operation for protecting the Y shift register 131, which is electrically connected to the first Y power line 501a and the second Y power line 502a, by using the Y inter-power-supply protective circuit 135 provided for the four types of power lines in the Y power line group 510a shown in FIG. 2 will be described with reference to FIG. 7.

Figure 7:
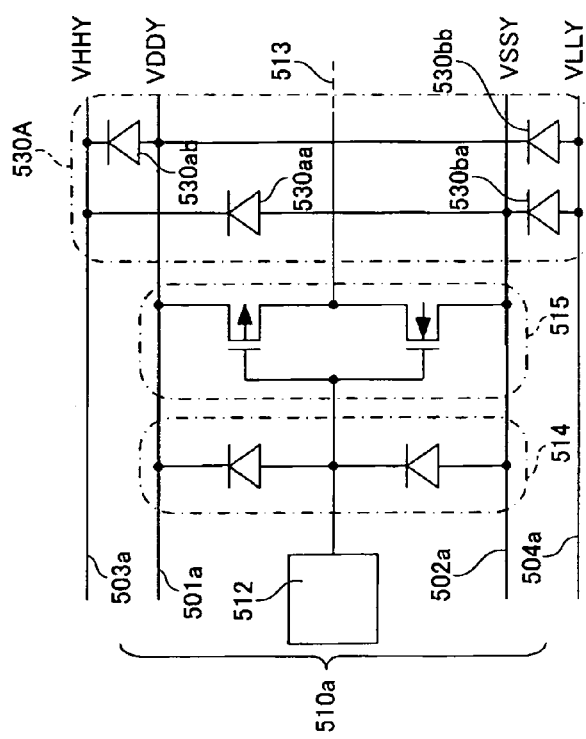
FIG. 7 is an exemplary circuit diagram showing an example of the configuration of a unit circuit in the Y inter-power-supply protective circuit 135 according to the embodiment of the present invention.

In FIG. 7, the Y inter-power-supply protective circuit 135 includes a unit circuit including four types of diodes. In FIG. 7, elements which are the same as those in FIG. 5(a) are denoted by the same reference numerals, and the corresponding description will be omitted.

The Y inter-power-supply protective circuit 135 is provided between the second Y power line 502a and the third Y power line 503a, between the first Y power line 501a and the third Y power line 503a, between the second Y power line 502a and the fourth Y power line 504a, and between the first Y power line 501a and the fourth Y power line 504a.

In a unit circuit 530A shown in FIG. 7, a high-potential-side diode 530aa is provided between the second Y power line 502a and the third Y power line 503a. By using the diode 530aa, an electrical path for dissipating static applied to one of the second Y power line 502a and the third Y power line 503a to the other can be realized.

In the unit circuit 530A, a high-potential-side diode 530ab is provided between the first Y power line 501a and the third Y power line 503a. By using the diode 530ab, an electrical path for dissipating static applied to one of the first Y power line 501a and the third Y power line 503a to the other can be realized.

Also, in the unit circuit 530A, a low-potential-side diode 530ba is provided between the second Y power line 502a and the fourth Y power line 504a. By using the diode 530ba, an electrical path for dissipating static applied to one of the second Y power line 502a and the fourth Y power line 504a to the other can be realized.

Further, in the unit circuit 530A, a low-potential-side diode 530bb is provided between the first Y power line 501a and the fourth Y power line 504a. By using the diode 530bb, an electrical path for dissipating static applied to one of the first Y power line 501a and the fourth Y power line 504a to the other can be realized.

In the unit circuit 530A of the Y inter-power-supply protective circuit 135, the two high-potential-side diodes 530aa and 530ab have the same configuration. Hereinafter, a specific configuration of one of the diodes 530aa and 530ab, that is, the diode 530aa, will be described with reference to FIG. 7. The cathode of the diode 530aa is electrically connected to the third Y power line 503a in the high-potential side, and the anode thereof is electrically connected to the second Y power line 502a in the low-potential side.

Also, in the unit circuit 530A of the Y inter-power-supply protective circuit 135, the two low-potential-side diodes 530ba and 530bb have the same configuration. Hereinafter, a specific configuration of one of the diodes 530ba and 530bb, that is, the diode 530ba, will be described with reference to FIG. 7. The cathode of the diode 530ba is electrically connected to the second Y power line 502a in the high-potential side, and the anode thereof is electrically connected to the fourth Y power line 504a in the low-potential side.

When static of a higher potential than that of the third Y power VHHY is applied to the first Y power line 501a, the static is discharged to the third Y power line 503a by the high-potential-side diode 530ab, the anode thereof being electrically connected to the first Y power line 501a. As in the first Y power line 501a, when static of a higher potential than that of the third Y power VHHY is applied to the second Y power line 502a, the static is discharged to the third Y power line 503a by the high-potential-side diode 530aa, the anode thereof being electrically connected to the second Y power line 502a.

Further, when static of a lower potential than that of the fourth Y power VLLY is applied to the first Y power line 501a, the static is discharged to the fourth Y power line 504a by the low-potential-side diode 530bb, the cathode thereof being electrically connected to the first Y power line 501a. As in the first Y power line 501a, when static of a lower potential than that of the fourth Y power VLLY is applied to the second Y power line 502a, the static is discharged to the fourth Y power line 504a by the low-potential-side diode 530ba, the cathode thereof being electrically connected to the second Y power line 502a.

Accordingly, as the Y inter-power-supply protective circuit 135 shown in FIG. 6, the Y inter-power-supply protective circuit 135 shown in FIG. 7 can increase the static resistance of the Y shift register 131. Further, even when the liquid crystal panel 100 is being driven, the scanning-line driving circuit 130 can be operated while hardly being affected by the energized Y inter-power-supply protective circuit 135.

In the unit circuit 530A shown in FIG. 7, the four types of diodes can be replaced by four transistors. In that case, each transistor is diode-connected to corresponding two power lines, as the transistor described with reference to FIG. 6(b).

In the embodiment, the X inter-power-supply protective circuit 155 shown in FIG. 3 may have the same configuration as that of the Y inter-power-supply protective circuit 135 described with reference to FIG. 7. Therefore, as in the Y side, the static resistance of the X shift register 151 can be increased by the X inter-power-supply protective circuit 155 in the X side. Further, even when the liquid crystal panel 100 is being driven, the data-line driving circuit 150 can be operated while hardly being affected by the energized X inter-power-supply protective circuit 155.

Additionally, the static resistance of the liquid crystal panel 100 can also be increased by the Y inter-power-supply protective circuit 135 and the X inter-power-supply protective circuit 155 described with reference to FIG. 7.

Next, the exemplary configuration and operation for protecting the Y shift register 131 and the Y level shifter 132 of the scanning-line driving circuit 130 and the X shift register 151 and the X level shifter 152 of the data-line driving circuit 150, by using the inter-power-supply protective circuit which is provided for the Y power line group 510a shown in FIG. 2 and the X power line group 510b shown in FIG. 3, will be described with reference to FIG. 8.

Figure 8:
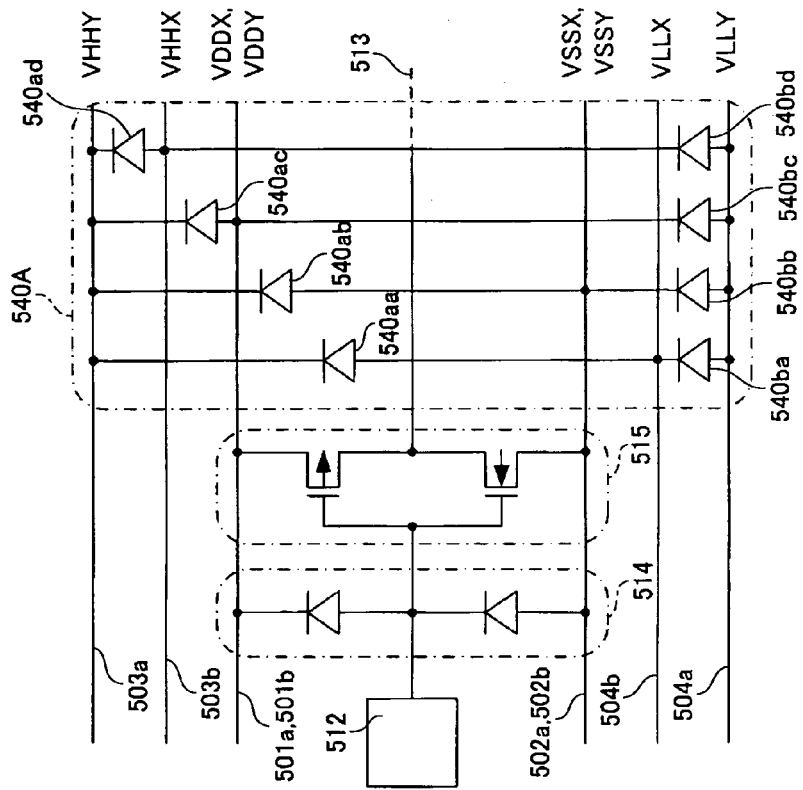
FIG. 8 is an exemplary circuit diagram showing an example of the configuration of a unit circuit in an inter-power-supply protective circuit according to the embodiment of the present invention.

In FIG. 8, the inter-power-supply protective circuit can include a unit circuit including eight types of diodes. In FIG. 8, elements which are the same as those in FIG. 5(a) are denoted by the same reference numerals, and the corresponding description will be omitted. In FIG. 8, the second Y power line 502a and the second X power line 502b, through which powers of the same potential are supplied, are shown by a single power line. As in the second Y power line 502a and the second X power line 502b, the first Y power line 501a and the first X power line 501b are shown by a single power line.

The inter-power-supply protective circuit is provided for the high-potential-side power lines in the Y power line group 510a and the X power line group 510b in the following manner: between the fourth X power line 504b and the third Y power line 503a; between the second Y power line 502a (or the second X power line 502b) and the third Y power line 503a; between the first Y power line 501a (or the first X power line 501b) and the third Y power line 503a; and between the third X power line 503b and the third Y power line 503a.

In the unit circuit 540A shown in FIG. 8, a high-potential-side diode 540aa is provided between the fourth X power line 504b and the third Y power line 503a. By using this diode 540aa, an electrical path for dissipating static applied to one of the fourth X power line 504b and the third Y power line 503a to the other can be realized.

Also, in the unit circuit 540A, a high-potential-side diode 540ab is provided between the second Y power line 502a (or the second X power line 502b) and the third Y power line 503a. By using this diode 540ab, an electrical path for dissipating static applied to one of the second Y power line 502a (or the second X power line 502b) and the third Y power line 503a to the other can be realized.

Also, in the unit circuit 540A, a high-potential-side diode 540ac is provided between the first Y power line 501a (or the first X power line 501b) and the third Y power line 503a. By using this diode 540ac, an electrical path for dissipating static applied to one of the first Y power line 501a (or the first X power line 501b) and the third Y power line 503a to the other can be realized.

Also, in the unit circuit 540A, a high-potential-side diode 540ad is provided between the third X power line 503b and the third Y power line 503a. By using this diode 540ad, an electrical path for dissipating static applied to one of the third X power line 503b and the third Y power line 503a to the other can be realized.

Also, the inter-power-supply protective circuit is provided for the low-potential-side power lines in the Y power line group 510a and the X power line group 510b in the following manner: between the fourth Y power line 504a and the fourth X power line 504b; between the fourth Y power line 504a and the second Y power line 502a (or the second X power line 502b); between the fourth Y power line 504a and the first Y power line 501a (or the first X power line 501b); and between the fourth Y power line 504a and the third X power line 503b.

In the unit circuit 540A shown in FIG. 8, a low-potential-side diode 540ba is provided between the fourth Y power line 504a and the fourth X power line 504b. By using this diode 540ba, an electrical path for dissipating static applied to one of the fourth Y power line 504a and the fourth X power line 504b to the other can be realized.

Also, in the unit circuit 540A, a low-potential-side diode 540bb is provided between the fourth Y power line 504a and the second Y power line 502a (or the second X power line 502b). By using this diode 540bb, an electrical path for dissipating static applied to one of the fourth Y power line 504a and the second Y power line 502a (or the second X power line 502b) to the other can be realized.

Also, in the unit circuit 540A, a low-potential-side diode 540bc is provided between the fourth Y power line 504a and the first Y power line 501a (or the first X power line 501b). By using this diode 540bc, an electrical path for dissipating static applied to one of the fourth Y power line 504a and the first Y power line 501a (or the first X power line 501b) to the other can be realized.

Also, in the unit circuit 540A, a low-potential-side diode 540bd is provided between the fourth Y power line 504a and the third X power line 503b. By using this diode 540bd, an electrical path for dissipating static applied to one of the fourth Y power line 504a and the third X power line 503b to the other can be realized.

In the unit circuit 540A, the four types of high-potential-side diodes have the same configuration. Therefore, a specific configuration of one of the four types of diodes, that is, the diode 540aa, will be described with reference to FIG. 8. The cathode of the diode 540aa is electrically connected to the third Y power line 503a in the high-potential side and the anode thereof is electrically connected to the fourth X power line 504b in the low-potential side.

Also, in the unit circuit 540A, the four types of low-potential-side diodes have the same configuration. Therefore, a specific configuration of one of the four types of diodes, that is, the diode 540ba, will be described with reference to FIG. 8. The cathode of the diode 540ba is electrically connected to the fourth X power line 504b in the high-potential side and the anode thereof is electrically connected to the fourth Y power line 504a in the low-potential side.

When static of a higher potential than that of the third Y power VHHY is applied to the fourth X power line 504b, the static is discharged to the third Y power line 503a by the high-potential-side diode 540aa, the anode thereof being electrically connected to the fourth X power line 504b. Also, when static of a higher potential than that of the third Y power VHHY is applied to the second Y power line 502a (or the second X power line 502b), the first Y power line 501a (or the first X power line 501b), or the third X power line 503b, the static is discharged to the third Y power line 503a by the corresponding high-potential-side diode 540ab, 540ac, or 540ad, as in the fourth X power line 504b.

Further, when static of a lower potential than that of the fourth Y power VLLY is applied to the fourth X power line 504b, the static is discharged to the fourth Y power line 504a by the low-potential-side diode 540ba, the cathode thereof being electrically connected to the fourth X power line 504b. Also, when static of a lower potential than that of the fourth Y power VLLY is applied to the second Y power line 502a (or the second X power line 502b), the first Y power line 501a (or the first X power line 501b), or the third X power line 503b, the static is discharged to the fourth Y power line 504a by the corresponding low-potential-side diode 540bb, 540bc, or 540bd, as in the fourth X power line 504b.

Accordingly, as the Y inter-power-supply protective circuit 135 shown in FIGS. 6 and 7, the inter-power-supply protective circuit shown in FIG. 8 can increase the static resistance of the Y shift register 131 and the Y level shifter 132 of the scanning-line driving circuit 130 and the X shift register 151 and the X level shifter 152 of the data-line driving circuit 150. Furthermore, even when the liquid crystal panel 100 is being driven, the scanning-line driving circuit 130 and the data-line driving circuit 150 can be operated while hardly being affected by the energized inter-power-supply protective circuit.

In the unit circuit 540A shown in FIG. 8, the eight types of diodes may be replaced by eight transistors. In that case, each of the eight transistors is diode-connected to corresponding two power lines, as the transistor described with reference to FIG. 6(b).

In addition, by using the inter-power-supply protective circuit described with reference to FIG. 8, the static resistance of the liquid crystal panel 100 can be increased.

As described above, the static resistance can be increased in the embodiment. Therefore, manufacturing yield of the liquid crystal apparatus 1 can be increased and destruction of the apparatus after shipment can be prevented.

Figure 10:
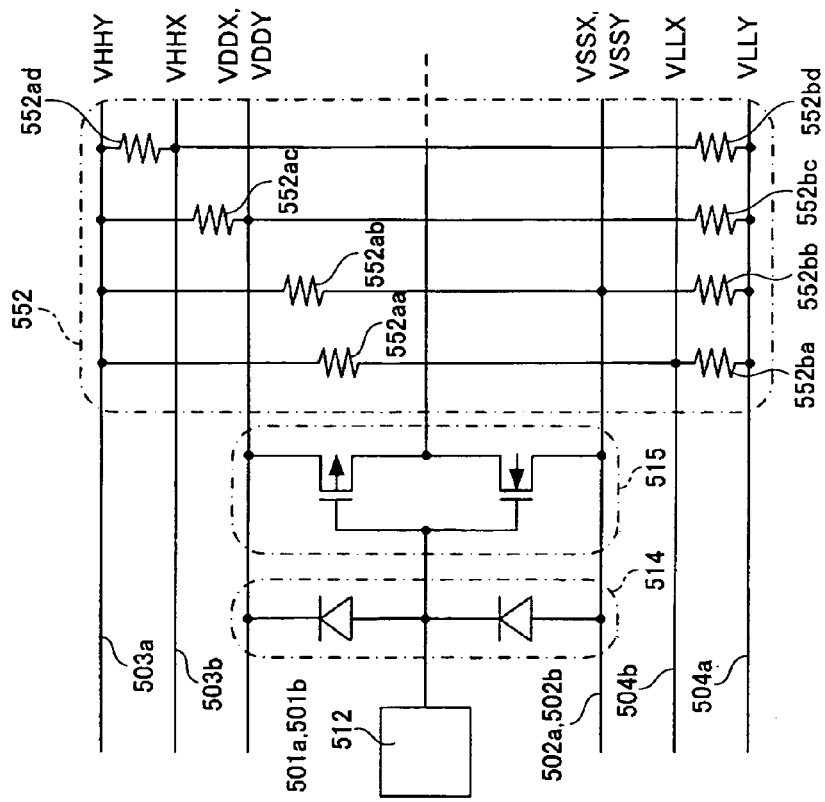
FIG. 10 is an exemplary circuit diagram showing a modification of the unit circuit shown in FIG. 8.
Figure 9:
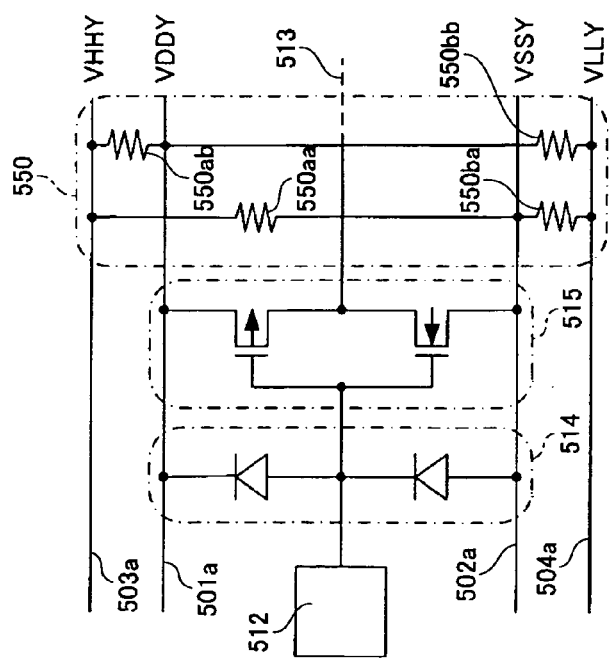
FIG. 9 is an exemplary circuit diagram showing a modification of the unit circuit shown in FIG. 7.

Next, modifications of the inter-power-supply protective circuit will be described with reference to FIGS. 9 and 10. FIG. 9 shows the configuration of a modification of the unit circuit in the Y inter-power-supply protective circuit 135 described with reference to FIG. 7, and FIG. 10 shows the configuration of a modification of the unit circuit in the inter-power-supply protective circuit described with reference to FIG. 8. In FIG. 9, elements which are the same as those in FIG. 7 are denoted by the same reference numerals, and the corresponding description will be omitted. Likewise, in FIG. 10, elements which are the same as those in FIG. 8 are denoted by the same reference numerals, and the corresponding description will be omitted.

In FIG. 9, the Y inter-power-supply protective circuit 135 may include a unit circuit 550 instead of the unit circuit shown in FIG. 7. The unit circuit 550 shown in FIG. 9 includes four resistors 550aa, 550ab, 550ba, and 550bb, instead of the four types of diodes 530aa, 530ab, 530ba, and 530bb.

More specifically, the unit circuit 550 in FIG. 9 includes the high-potential-side resistor 550aa electrically connected between the second Y power line 502a and the third Y power line 503a, the high-potential-side resistor 550ab electrically connected between the first Y power line 501a and the third Y power line 503a, the low-potential-side resistor 550ba electrically connected between the second Y power line 502a and the fourth Y power line 504a, and the low-potential-side resistor 550bb electrically connected between the first Y power line 501a and the fourth Y power line 504a.

Also, in the unit circuit 550, the high-potential-side resistor 550aa and the low-potential-side resistor 550ba, which are electrically connected to the second Y power line 502a, are electrically connected to each other. Likewise, the high-potential-side resistor 550*ab* and the low-potential-side resistor 550*bb*, which are electrically connected to the first Y power line 501*a*, are electrically connected to each other.

When static of a higher potential than that of the third Y power VHHY is applied to the first Y power line 501*a*, the static is diffused and discharged to the third Y power line 503*a* and to the fourth Y power line 504*a* through the low-potential-side resistor 550*bb* by the high-potential-side resistor 550*ab*, which is electrically connected to the first Y power line 501*a*. As in the first Y power line 501*a*, when static of a higher-potential than that of the third Y power VHHY is applied to the second Y power line 502*a*, the static is diffused and discharged to the third Y power line 503*a* and to the fourth Y power line 504*a* through the low-potential-side resistor 550*ba* by the high-potential-side resistor 550*aa*, which is electrically connected to the second Y power line 502*a*.

Further, when static of a lower potential than that of the fourth Y power VLLY is applied to the first Y power line 501*a*, the static is diffused and discharged to the third Y power line 503*a* through the high-potential-side resistor 550*ab* and to the fourth Y power line 504*a* by the low-potential-side resistor 550*bb*, which is electrically connected to the first Y power line 501*a*. Likewise, when static of a lower potential than that of the fourth Y power line VLLY is applied to the second Y power line 502*a*, the static is diffused and discharged in the same way as in the first Y power line 501*a*.

Therefore, in the unit circuit of the Y inter-power-supply protective circuit 135, the four resistors 550*aa*, 550*ab*, 550*ba*, and 550*bb* may be used instead of the four types of diodes 530*aa*, 530*ab*, 530*ba*, and 530*bb*. In this case, the same advantages as in the Y inter-power-supply protective circuit 135 shown in FIG. 7 can be obtained. In this modification, the X inter-power-supply protective circuit 155 shown in FIG. 3 may have the same configuration as that of the Y inter-power-supply protective circuit 135 described with reference to FIG. 9.

Also, the exemplary inter-power-supply protective circuit may include a unit circuit 552 shown in FIG. 10 instead of the unit circuit shown in FIG. 8. The unit circuit 552 shown in FIG. 10 includes eight resistors instead of the eight types of diodes.

In the unit circuit 552 shown in FIG. 10, four types of high-potential-side resistors include: a high-potential-side resistor 552*aa* electrically connected between the fourth X power line 504*b* and the third Y power line 503*a*; a high-potential-side resistor 552*ab* electrically connected between the second Y power line 502*a* (or the second X power line 502*b*) and the third Y power line 503*a*; a high-potential-side resistor 552*ac* electrically connected between the first Y power line 501*a* (or the first X power line 501*b*) and the third Y power line 503*a*; and a high-potential-side resistor 552*ad* electrically connected between the third X power line 503*b* and the third Y power line 503*a*.

Also, in the unit circuit 552, four types of low-potential-side resistors include: a low-potential-side resistor 552*ba* electrically connected between the fourth Y power line 504*a* and the fourth X power line 504*b*; a low-potential-side resistor 552*bb* electrically connected between the fourth Y power line 504*a* and the second Y power line 502*a* (or the second X power line 502*b*); a low-potential-side resistor 552*bc* electrically connected between the fourth Y power line 504*a* and the first Y power line 501*a* (or the first X power line 501*b*); and a low-potential-side resistor 552*bd* electrically connected between the fourth Y power line 504*a* and the third X power line 503*b*.

The high-potential-side resistor 552*aa*, which is electrically connected to the fourth X power line 504*b*, is electrically connected to the low-potential-side resistor 552*ba*; the high-potential-side resistor 552*ab*, which is electrically connected to the second Y power line 502*a* (or the second X power line 502*b*), is electrically connected to the low-potential-side resistor 552*bb*; the high-potential-side resistor 552*ac*, which is electrically connected to the first Y power line 501*a* (or the first X power line 501*b*), is electrically connected to the low-potential-side resistor 552*bc*; and the high-potential-side resistor 552*ad*, which is electrically connected to the third X power line 503*b*, is electrically connected to the low-potential-side resistor 552*bd*.

When static of a higher potential than that of the third Y power VHHY is applied to the fourth X power line 504*b*, the static is diffused and discharged to the third Y power line 503*a* and to the fourth Y power line 504*a* through the low-potential-side resistor 552*ba* by the high-potential-side resistor 552*aa*, which is electrically connected to the fourth X power line 504*b*. Likewise, when static of a higher potential than that of the third Y power VHHY is applied to the second Y power line 502*a* (or the second X power line 502*b*), the first Y power line 501*a* (or the first X power line 501*b*), or the third X power line 503*b*, the static is diffused and discharged to the third Y power line 503*a* and the fourth Y power line 504*a* by the corresponding high-potential-side resistor 552*ab*, 552*ac*, or 552*ad*, as in the fourth X power line 504*b*.

Further, when static of a lower potential than that of the fourth Y power VLLY is applied to the fourth X power line 504*b*, the static is diffused and discharged to the third Y power line 503*a* through the high-potential-side resistor 552*aa* and to the fourth Y power line 504*a* by the low-potential-side resistor 552*ba*, which is electrically connected to the fourth X power line 504*b*. Likewise, when static of a lower potential than that of the fourth Y power VLLY is applied to the second Y power line 502*a* (or the second X power line 502*b*), the first Y power line 501*a* (or the first X power line 501*b*), or the third X power line 503*b*, the static is diffused and discharged to the third Y power line 503*a* and the fourth Y power line 504*a* by the corresponding low-potential-side resistor 552*bb*, 552*bc*, or 552*bd*, as in the fourth X power line 504*b*.

Accordingly, in the unit circuit of the inter-power-supply protective circuit, the eight types of diodes may be replaced by the eight resistors. In this case, too, the same advantages as in the inter-power-supply protective circuit shown in FIG. 8 can be obtained.

In this modification, the resistance of each resistor in the unit circuit shown in FIG. 9 or FIG. 10 is preferably adjusted at the following value. In other words, the resistance may be set so that the value of a current flowing between two power lines corresponding to each resistor is 10% or less of a current consumed as supplied power.

With this configuration, even if the inter-power-supply protective circuit includes a resistor, a driving operation in the driving circuit 120 is not interfered. More specifically, changes in voltage in the power lines (voltage drop in the high-potential side or voltage rise in the low-potential side) do not cause current abnormality for the Y shift register 131 and the Y level shifter 132 of the scanning-line driving circuit 130 and the X shift register 151 and the X level shifter 152 of the data-line driving circuit 150.

Figure 11:
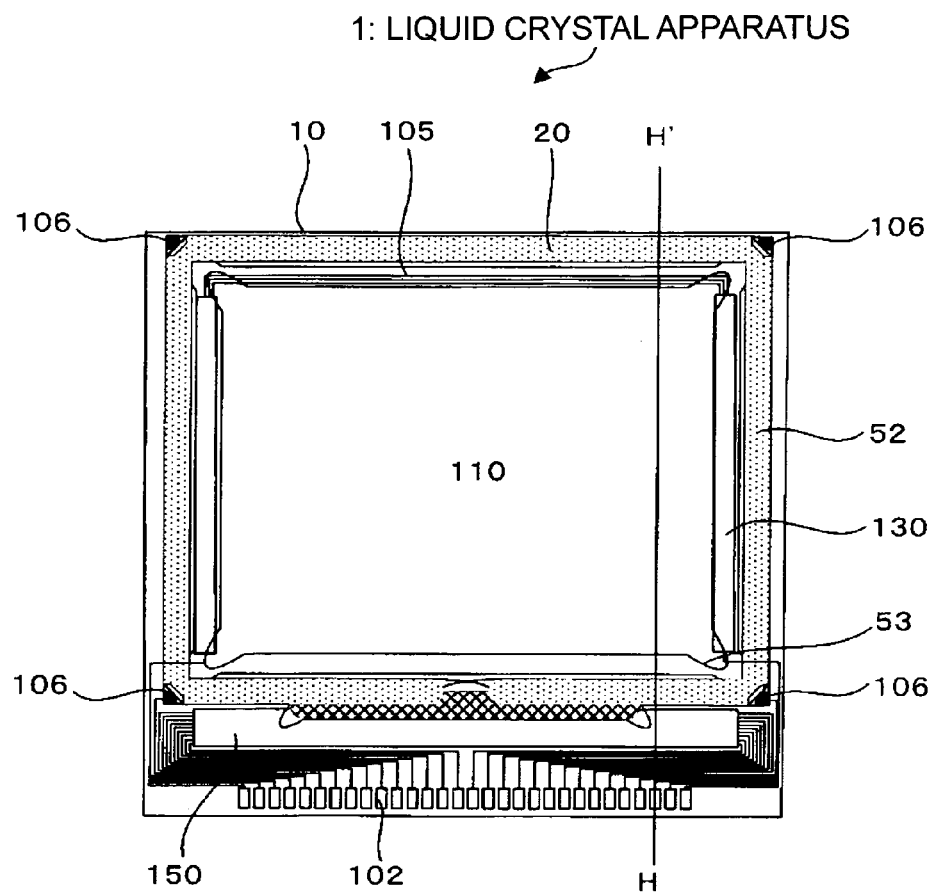
FIG. 11 is a plan view showing the entire configuration of the liquid crystal apparatus.
Figure 12:
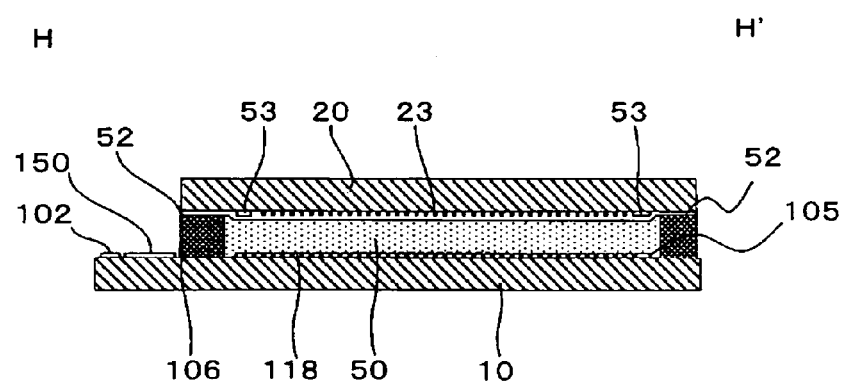
FIG. 12 is a cross-sectional view taken along the line H-H' in FIG. 11.

Hereinafter, the entire configuration of the liquid crystal apparatus 1 will be described with reference to FIGS. 11 and 12. FIG. 11 is a plan view showing a TFT array substrate 10, on which each element is disposed, viewed from the side of the opposing substrate 20. FIG. 12 is a cross-sectional view taken along the line H-H' in FIG. 11.

In FIGS. 11 and 12, a sealing member 52 housing a photo-curing resin is provided along the image display area 110 on the TFT array substrate 10. The sealing member 52 is used for bonding the both substrates so as to enclose a liquid crystal layer 50 at the periphery of the image display area 110, which is defined by the plurality of pixel electrodes 118 (that is, an area in the liquid crystal apparatus where images are displayed in accordance with changes in alignment in the liquid crystal layer 50). Also, a frame light-shielding film 53 is provided between the image display area 110 and the sealing member 52 on the opposing substrate 20. The frame light-shielding film 53 and a light-shielding layer 23 may be disposed on the TFT array substrate 10.

The scanning-line driving circuit 130 is provided along each of the right and left sides of the image display area 110. Herein, if the drive delay in the scanning lines 112 is allowable, the scanning-line driving circuit 130 may be provided in only one side.

In the area outside the sealing member 52, the data-line driving circuit 150 and external-circuit connecting terminals 102 for inputting signals from the outside are provided along the lower side of the image display area 110. Also, the scanning-line driving circuit 130 is provided along each of the right and left sides of the image display area 110. The data-line driving circuit 150 may be provided along each of the upper and lower sides of the image display area 110. At this time, for example, odd-numbered data lines may be electrically connected to one of the data-line driving circuits 150 and even-numbered data lines may be electrically connected to the other data-line driving circuit 150, so that the data lines may be driven in an interdigital manner from the upper and lower sides. Further, a plurality of wiring lines 105 for supplying power and driving signals to the scanning-line driving circuit 130 are provided in the upper side of the image display area 110. Also, a conductor 106 for establishing electrical conduction between the TFT array substrate 10 and the opposing substrate 20 is provided at at least one of the corners of the opposing substrate 20. The opposing substrate 20, which has almost the same profile as that of the sealing member 52, is fixed to the TFT array substrate 10 by the sealing member 52.

In the above-described exemplary embodiment, an external control circuit for outputting clock signals or image signals to the data-line driving circuit 150 and the scanning-line driving circuit 130 is provided outside the liquid crystal apparatus. However, it should be understood that the present invention is not limited to this configuration, but the control circuit may be provided inside the liquid crystal apparatus. In particular, regarding the clock signals, only clock signals may be supplied from the external control circuit, and a circuit for generating opposite-phase clock signals may be provided on the substrate for the liquid crystal apparatus.

The above-described liquid crystal apparatus 1 can be applied to a color liquid crystal projector or the like. In that case, three liquid crystal apparatuses 1 are used as RGB light valves. Three colors of RGB are separated by dichroic mirrors for RGB color separation, and each color enters a corresponding panel. Accordingly, in the above-described embodiment, color filters are not provided on the opposing substrate 20. However, RGB color filters may be provided together with protective films on the opposing substrate 20 of the liquid crystal apparatus 1. In that case, the RGB color filters are placed in a predetermined area facing the pixel electrodes 118, where the light-shielding layer 23 is not disposed. With this configuration, the liquid crystal apparatus of the embodiment can be applied to color liquid crystal apparatuses other than liquid crystal projectors, such as direct-view or reflective color liquid crystal television sets.

The switching elements used in the liquid crystal apparatus 1 may be staggered or coplanar polysilicon TFTs, or may be inversely-staggered TFTs or amorphous silicon TFTs. Further, in the liquid crystal apparatus 1, the liquid crystal layer 50 includes nematic liquid crystal. However, when polymer dispersed liquid crystal, in which liquid crystal droplets are dispersed in polymer, is used, an alignment layer, a polarizing film, and a polarizing plate are not necessary. Accordingly, light usage efficiency is increased, so that the luminance of the liquid crystal apparatus increases and power consumption can be reduced advantageously.

Next, various electronic apparatuses to which the above-described liquid crystal apparatus 1 is applied will be described.

Figure 13:
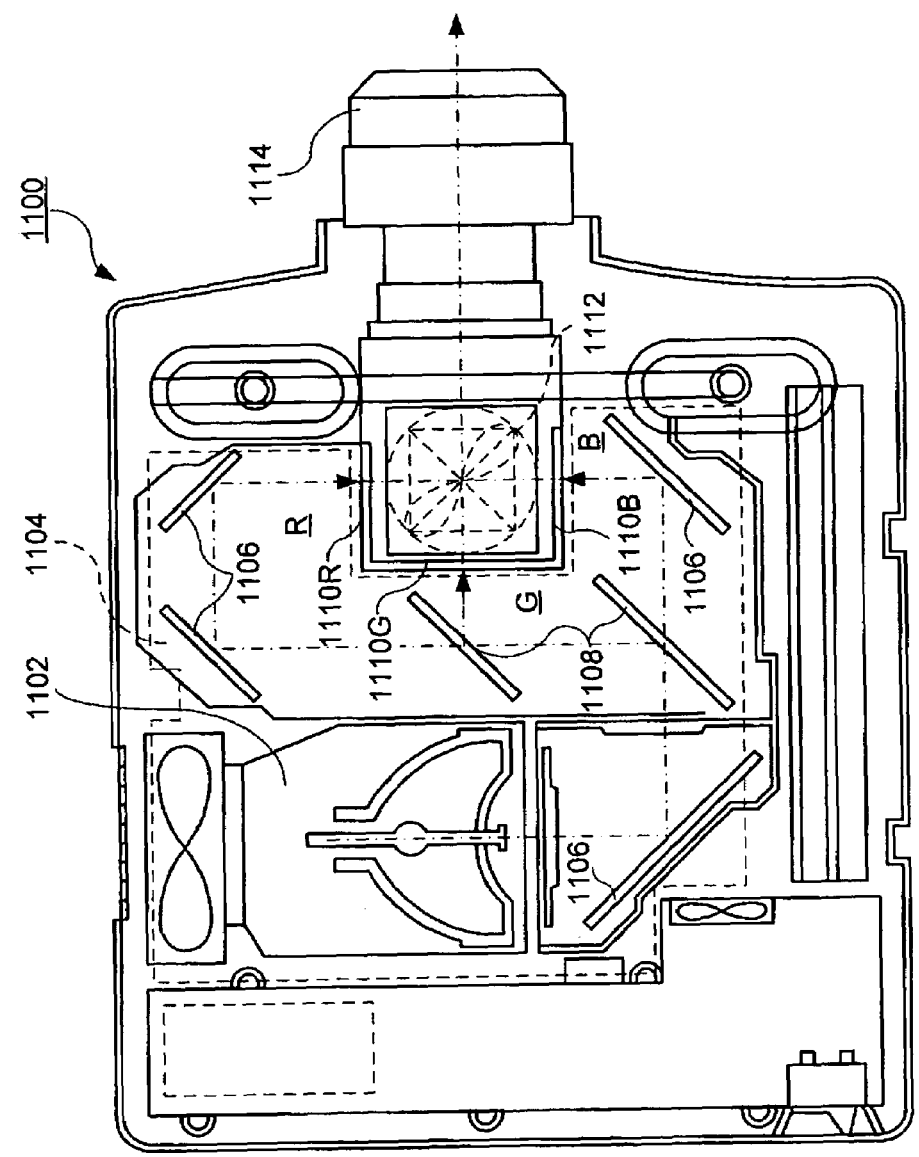
FIG. 13 is a cross-sectional view showing the configuration of a projector, which is an example of an electronic apparatus to which the liquid crystal apparatus is applied.

First, a projector including the liquid crystal apparatus 1 serving as a light valve will be described. FIG. 13 is a plan view showing an example of the configuration of the projector. As shown in this figure, a lamp unit 1102 including a white light source, such as a halogen lamp, is provided inside the projector 1100. Projection light from the lamp unit 1102 is separated into light beams of three primary colors of R, G, and B by four mirrors 1106 and two dichroic mirrors 1108 in a light guide 1104, and the three light beams enter liquid crystal panels 1110R, 1110B, and 1110G, serving as light valves corresponding to the three primary colors, respectively.

Each of the liquid crystal panels 1110R, 1110B, and 1110G have the same configuration as that of the above-described liquid crystal panel 100, and these panels are driven by RGB primary color signals supplied from the image-signal processing circuit 300. The light beams modulated by these liquid crystal panels enter a dichroic prism 1112 from three directions. In the dichroic prism 1112, R and B light beams are refracted at 90 degrees, and a G light beam travels in a straight line. Accordingly, images corresponding to the three colors are synthesized, so that the generated color image is projected on a screen or the like through a projection lens 1114.

Regarding display images formed by the liquid crystal panels 1110R, 1110B, and 1110G, a display image formed by the liquid crystal panel 1110G must be horizontally reversed to the display images formed by the liquid crystal panels 1110R and 1110B.

Since light beams corresponding to the three primary colors of R, G, and B enter the liquid crystal panels 1110R, 1110B, and 1110G by the dichroic mirrors 1108, color filters need not be provided.

Figure 14:
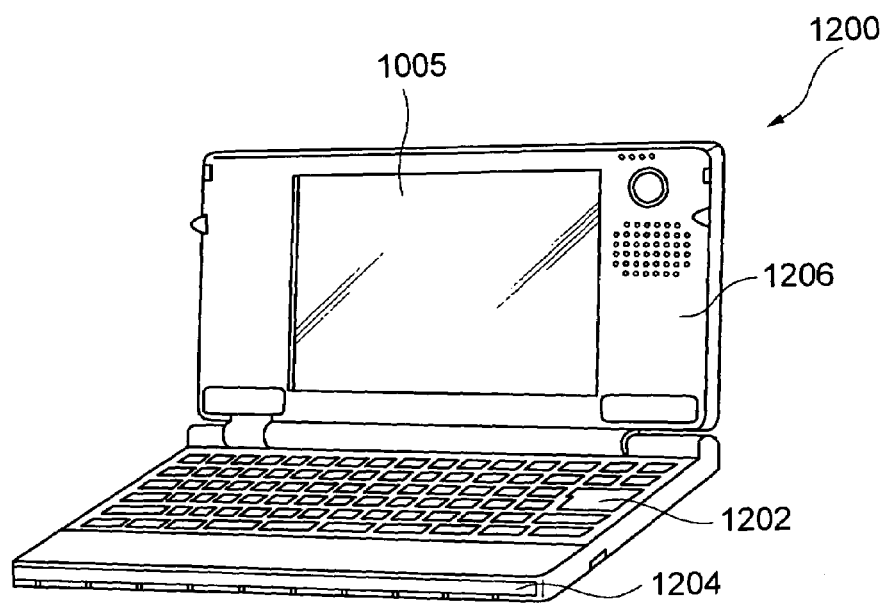
FIG. 14 is a perspective view showing the configuration of a personal computer, which is an example of an electronic apparatus to which the liquid crystal apparatus is applied.

Next, a mobile personal computer to which the liquid crystal panel is applied will be described. FIG. 14 is a perspective view showing the configuration of the personal computer. In the figure, the computer 1200 includes a main unit 1204 including a keyboard 1202 and a liquid crystal display unit 1206. The liquid crystal display unit 1206 is formed by providing a back light on the rear surface of the liquid crystal panel 1005.

Figure 15:
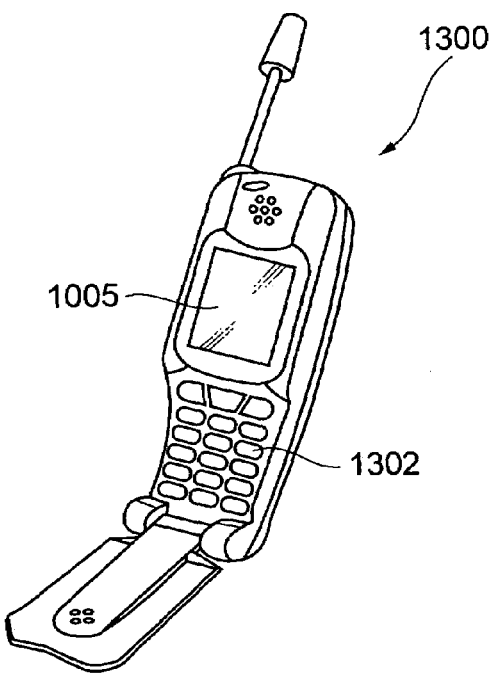
FIG. 15 is a perspective view showing the configuration of a mobile phone, which is an example of an electronic apparatus to which the liquid crystal apparatus is applied.

Next, a mobile phone to which the liquid crystal panel is applied will be described. FIG. 15 is a perspective view showing the configuration of the mobile phone. In the figure, the mobile phone 1300 includes a plurality of operation buttons 1302 and a reflective liquid crystal panel 1005. In the reflective liquid crystal panel 1005, a front light is provided on the front surface thereof as necessary.

Of course, the liquid crystal apparatus of the exemplary embodiment can be applied to various electronic apparatuses other than the electronic apparatuses described with reference to FIGS. 13 to 15. For example, the liquid crystal apparatus can be applied to liquid crystal television sets, view-finder or monitor direct-view videotape recorders, car navigation systems, pagers, electronic notepads, electronic calculators, word processors, work stations, television telephones, POS terminals, and apparatuses including a touch panel.

It should be understood that the invention is not limited to the above-described embodiment, and modifications can be made without deviating from the scope and spirits of the present invention, which can be understood from the attached claims and the entire specification. Therefore, such a modified driving circuit, a method for protecting the same, and an electro-optical apparatus and an electronic apparatus including the driving circuit are included in the scope of the present invention.

What is claimed is:

1. A driving circuit for driving an electro-optical panel comprising:
    a first power line for supplying a first power;
    a second power line for supplying a second power;
    a third power line for supplying a third power;
    a fourth power line for supplying a fourth power;
    a shift register that generates transfer pulses in synchronization with a clock signal when a transfer-starting pulse is input to the shift register and that outputs an end pulse from a last stage of the shift register, the shift register being connected to the first power line and the second power line;
    a level shifter that shifts voltage of each of the transfer pulses from a voltage between potentials of the first power and the second power to a voltage between potentials of the third power and the fourth power and that outputs driving signals, the level shifter being connected to the third power line and the fourth power line;
    a first protective circuit that is provided between the third power line and the fourth power line;
    a first signal line for supplying the transfer-starting pulse;
    a second signal line for supplying the end pulse;
    second protective circuits that are provided between the first signal line and the first power line and between the first signal line and the second power line; and
    third protective circuits that are provided between the second signal line and the first power line and between the second signal line and the second power line.

2. The driving circuit according to claim 1, further comprising a fourth protective circuit that is provided between the first power and second power lines.

3. The driving circuit according to claim 1, further comprising:
    third signal lines, each of the signal lines for supplying each of the driving signals; and
    fifth protective circuits that are provided between each of the third signal lines and the third power line and between each of the third signal lines and the fourth power line.

4. The driving circuit according to claim 1, potentials of powers increasing in order of the fourth power, the second power, the first power, and the third power.

5. The driving circuit according to claim 1, the first protective circuit including a diode or a diode-connected semiconductor device.

6. The driving circuit according to claim 1, the first protective circuit comprising an N-type transistor, a P-type transistor, or a PIN junction transistor.

7. The driving circuit according to claim 1, the first protective circuit comprising a resistor.

8. The driving circuit according to claim 7, a resistance of the resistor being set so that a value of a current flowing between the third power line and the fourth power line is 10% or less of a value of a current consumed as the supplied powers.

9. An electro-optical apparatus, comprising the driving circuit according to claim 1 and the electro-optical panel.

10. An electronic apparatus, comprising the electro-optical apparatus according to claim 9.

11. The electronic apparatus according to claim 10, wherein the apparatus is selected from the group consisting of projection display apparatuses, liquid crystal television sets, mobile phones, electronic notepads, word processors, view-finder or monitor direct-view videotape recorders, work stations, television telephones, POS terminals, touch panels, and electrophoretic devices.

12. The driving circuit according to claim 1, wherein at least one of the first, second and third protective circuits is configured to diffuse and eliminate static applied to the power lines through an electrical path included in the at least on protective circuit.

13. The driving circuit according to claim 12, wherein the at least one protective circuit is energized to protect the driving circuit so that potentials on at least two power lines are maintained in a predetermined relationship when static is applied to the at least two power lines.

14. The driving circuit according to claim 1, wherein at least one of the first, second and third protective circuits is configured to be energized so that potentials on the power lines corresponding to the at least one protective circuit are maintained in a predetermined relationship when the driving circuit is being driven.

15. The driving circuit according to claim 1, wherein while the driving circuit is not receiving power and is not being operated, at least one of the first, second and third protective circuits is configured so that when static of a higher potential than the of a high-potential-side one of the power lines is applied to a low-potential-side one of the power lines, the at least one protective circuit discharges the static to the high-potential-side power line.

16. The driving circuit according to claim 1, wherein the while the driving circuit is not receiving power and is not being operated, at least one of the first, second and third protective circuits is configured so that when static of a lower potential than that of a low-potential-side one of the power lines is applied to a high-potential-side one of the power lines, the at least one protective circuit discharges the static to the low-potential-side power line.

17. The driving circuit according to claim 1, wherein while the driving circuit is receiving power, at least one of the first, second and third protective circuit is configured so that when static of a higher potential than the of a high-potential-side one of the power lines is applied to a low-potential-side one of the power lines, the at least one protective circuit discharges the static to the high-potential-side power line.

18. The driving circuit according to claim 1, wherein while the driving circuit is receiving power, at least one of the first, second and third protective circuit is configured so that when static of a lower potential than that of a low-potential-side one of the power lines is applied to a high-potential-side one of the power lines, the at least one protective circuit discharges the static to the low-potential-side power line.

19. The driving circuit according to claim 1, wherein at least one of the first, second and third protective circuits dissipates static applied to the power line corresponding to the at least one protective circuit by an electrical path included in the at least one protective circuit when the driving circuit is being operated and when the driving circuit is not being operated.

20. The driving circuit according to claim 19, wherein the electrical path includes at least one of a path to the power line with the highest potential and a path to the power line with the lowest potential.

* * * * *